United States Patent
Bong

(10) Patent No.: US 9,213,449 B2
(45) Date of Patent: Dec. 15, 2015

(54) MOBILE TERMINAL USING PROXIMITY SENSOR AND METHOD OF CONTROLLING THE MOBILE TERMINAL

(75) Inventor: Byung Eun Bong, Seoul (KR)

(73) Assignee: LG Electronics Inc., Seoul (KR)

(*) Notice: Subject to any disclaimer, the term of this patent is extended or adjusted under 35 U.S.C. 154(b) by 1155 days.

(21) Appl. No.: 12/486,296

(22) Filed: Jun. 17, 2009

(65) Prior Publication Data

US 2010/0005390 A1  Jan. 7, 2010

(30) Foreign Application Priority Data

Jul. 1, 2008 (KR) .................. 10-2008-0063559
Jul. 1, 2008 (KR) .................. 10-2008-0063560

(51) Int. Cl.

| G06F 3/048 | (2013.01) |
|---|---|
| G06F 3/044 | (2006.01) |
| G06F 3/041 | (2006.01) |
| G06F 3/0482 | (2013.01) |
| G06F 3/0488 | (2013.01) |
| H04M 1/02 | (2006.01) |

(52) U.S. Cl.
CPC .............. *G06F 3/044* (2013.01); *G06F 3/048* (2013.01); *G06F 3/0414* (2013.01); *G06F 3/0416* (2013.01); *G06F 3/0482* (2013.01); *G06F 3/0488* (2013.01); *H04M 1/0235* (2013.01); *H04M 2250/12* (2013.01); *H04M 2250/22* (2013.01)

(58) Field of Classification Search
CPC ...................................... G06F 3/048
USPC ........................ 715/702, 823, 769
See application file for complete search history.

(56) References Cited

U.S. PATENT DOCUMENTS

| 6,437,811 | B1 | 8/2002 | Battles et al. | |
|---|---|---|---|---|
| 6,512,449 | B1 * | 1/2003 | Aizawa | 340/7.55 |
| 7,210,107 | B2 * | 4/2007 | Wecker et al. | 715/863 |
| 2002/0180763 | A1 | 12/2002 | Kung | |
| 2003/0004983 | A1 * | 1/2003 | Cohen | 707/500 |
| 2004/0021643 | A1 * | 2/2004 | Hoshino et al. | 345/173 |

(Continued)

FOREIGN PATENT DOCUMENTS

| CN | 1838053 A | 9/2006 |
|---|---|---|
| EP | 1 557 744 A1 | 7/2005 |

(Continued)

OTHER PUBLICATIONS

Chinese Office Action dated Mar. 2, 2011 issued in Application No. 200910142573.7 (with translation).

(Continued)

*Primary Examiner* — Anil Bhargava
(74) *Attorney, Agent, or Firm* — KED & Associates LLP

(57) ABSTRACT

A mobile terminal and a method of controlling the mobile terminal are provided. The method includes displaying a first screen on a display module; if a pressure-touch input is detected from the first screen, displaying one or more menu items associated with the first screen; choosing one of the menu items according to a level of pressure corresponding to the pressure-touch input; and if a predetermined amount of time elapses after the choosing of one of the menu items, performing an operation corresponding to the chosen menu item. Therefore, it is possible to control various operations performed by the mobile terminal in response to a pressure-touch input.

15 Claims, 29 Drawing Sheets

(56) References Cited

U.S. PATENT DOCUMENTS

| | | | |
|---|---|---|---|
| 2005/0184953 A1* | 8/2005 | Camp et al. ................... | 345/156 |
| 2005/0184959 A1* | 8/2005 | Kompe et al. .................. | 345/163 |
| 2006/0036955 A1 | 2/2006 | Baudisch et al. | |
| 2006/0132455 A1* | 6/2006 | Rimas-Ribikauskas et al. ............................ | 345/173 |
| 2006/0161871 A1* | 7/2006 | Hotelling et al. .............. | 715/863 |
| 2006/0238522 A1* | 10/2006 | Westerman et al. ........... | 345/173 |
| 2007/0250786 A1* | 10/2007 | Jeon et al. ..................... | 715/765 |
| 2008/0094367 A1* | 4/2008 | Van De Ven et al. .......... | 345/173 |
| 2008/0163119 A1* | 7/2008 | Kim et al. ...................... | 715/840 |
| 2008/0165141 A1* | 7/2008 | Christie ......................... | 345/173 |
| 2008/0204427 A1* | 8/2008 | Heesemans et al. ........... | 345/174 |
| 2009/0058822 A1* | 3/2009 | Chaudhri ....................... | 345/173 |
| 2009/0073003 A1* | 3/2009 | Chang ............................. | 341/22 |
| 2009/0256947 A1* | 10/2009 | Ciurea et al. .............. | 348/333.12 |

FOREIGN PATENT DOCUMENTS

| | | | |
|---|---|---|---|
| EP | 1 835 386 A2 | 9/2007 | |
| JP | 05-346923 A | 12/1993 | |
| JP | 11-203044 A | 7/1999 | |
| JP | 2006-039745 A | 2/2006 | |
| JP | 2008-508628 A | 3/2008 | |
| KR | 10-0381583 B1 | 4/2003 | |
| KR | 10-2008-0021949 A | 3/2008 | |

OTHER PUBLICATIONS

European Search Report for Application EP 09 16 2523 dated Sep. 2, 2015.

Gonzalo Ramos et al; "Pressure Widgets," Proceedings of the 2004 Conference on Human Factors in Computing Systems, Chi 04, Apr. 24, 2004, pp. 487-494; XP55208644, NY, NY, IDSN: 978-1-58-113702-6.

Jun Rekimoto et al; "PreSensell: Bi-directional Touch and Pressure Sensing Interactions with Tactile Feedback," Conference on Human Factors in Computer Systems Archive, Chi '06 Extended Abstracts on Human Factors in Computing Systems, ACM, US, Apr. 22, 2006, pp. 1253-1258, XP007908748; ISBN: 978-1-59593-298-3.

* cited by examiner

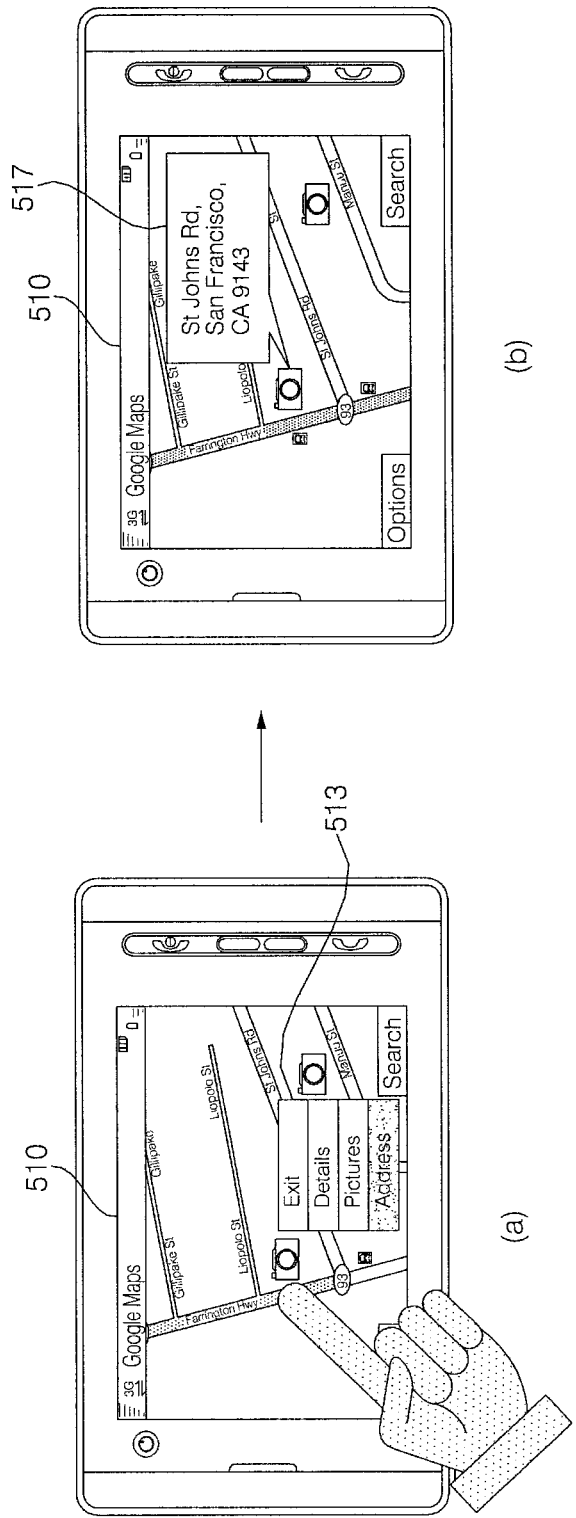

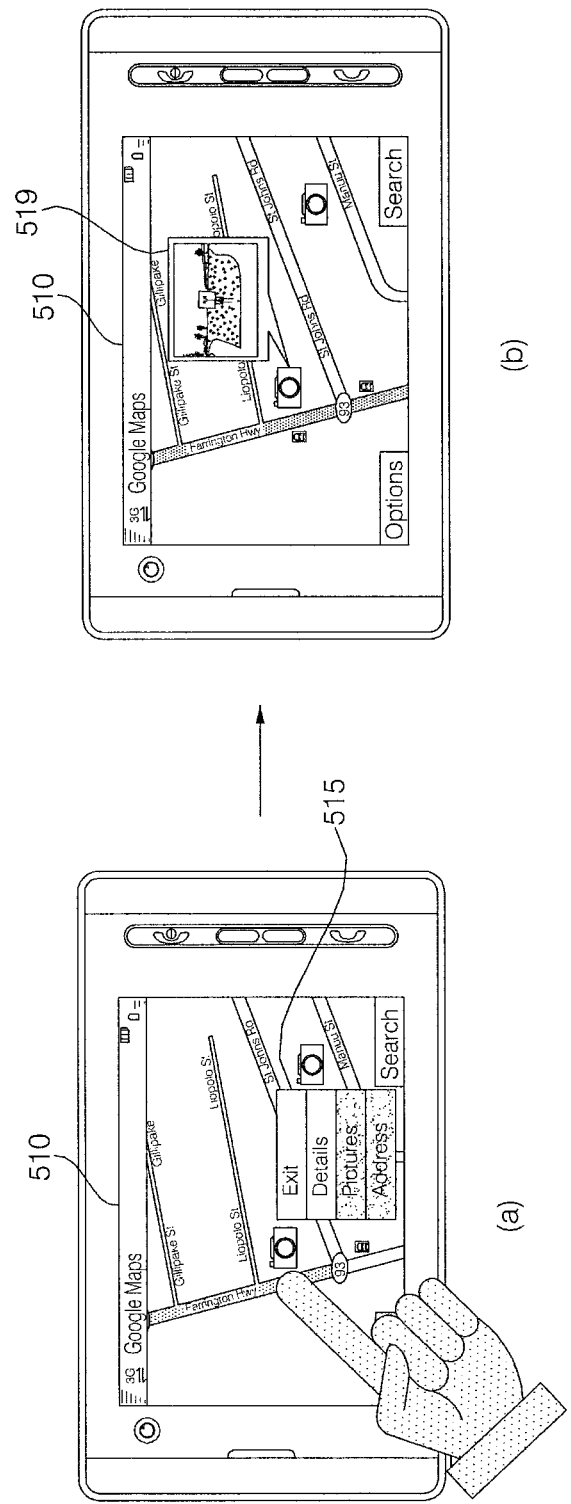

MOBILE TERMINAL USING PROXIMITY SENSOR AND METHOD OF CONTROLLING THE MOBILE TERMINAL

CROSS-REFERENCE TO RELATED APPLICATION

This application claims the priority benefit of Korean Patent Application No. 10-2008-0063559, filed on Jul. 1, 2008 and Korean Patent Application No. 10-2008-0063560, filed on Jul. 1, 2008, respectively, in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and more particularly, to a mobile terminal and a method of controlling the mobile terminal in which various operations can be effectively controlled in response to various pressure-touch signals.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a fill touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. The size of mobile terminals may be insufficient to properly perform data input and output functions even if they are equipped with full-touch screens. Therefore, it is necessary to develop ways to control the operation of a mobile terminal in various manners and thus enable a mobile terminal to perform both data input and output functions with the use of a full-touch screen.

SUMMARY OF THE INVENTION

The present invention provides a mobile terminal and a method of controlling the mobile terminal in which a screen displayed on a touch screen can be controlled in various manners in response to a pressure-touch input and a drag input detected from the touch screen.

According to an aspect of the present invention, there is provided a method of controlling a mobile terminal, the method including displaying a first screen on a display module; if a pressure-touch input is detected from the first screen, displaying one or more menu items associated with the first screen; choosing one of the menu items according to a level of pressure corresponding to the pressure-touch input; and if a predetermined amount of time elapses after the choosing of one of the menu items, performing an operation corresponding to the chosen menu item.

According to another aspect of the present invention, there is provided a method of controlling a mobile terminal, the method including displaying a first screen on a display module; if a touch-and-drag input is detected from the first screen, moving the first screen by a drag distance corresponding to the touch-and-drag input; and if a pressure touch-and-drag input is detected from the first screen, moving the first screen by an amount corresponding to a level of pressure corresponding to the pressure touch-and-drag input.

According to another aspect of the present invention, there is provided a mobile terminal including a display module configured to include a touch screen and display a first screen; a pressure sensor configured to detect a pressure-touch input from the display module and output a pressure signal indicating a level of pressure corresponding to the detected pressure-touch input; and a controller configured to display one or more menu items associated with the first screen in response to the detected pressure-touch input and control an operation corresponding to one of the menu items chosen in response to the detected pressure-touch input to be performed.

BRIEF DESCRIPTION OF THE DRAWINGS

The above and other features and advantages of the present invention will become more apparent by describing in detail preferred embodiments thereof with reference to the attached drawings in which:

FIGS. 10 through 14 illustrate diagrams for explaining how to display a set of menu items in response to a pressure-touch input;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
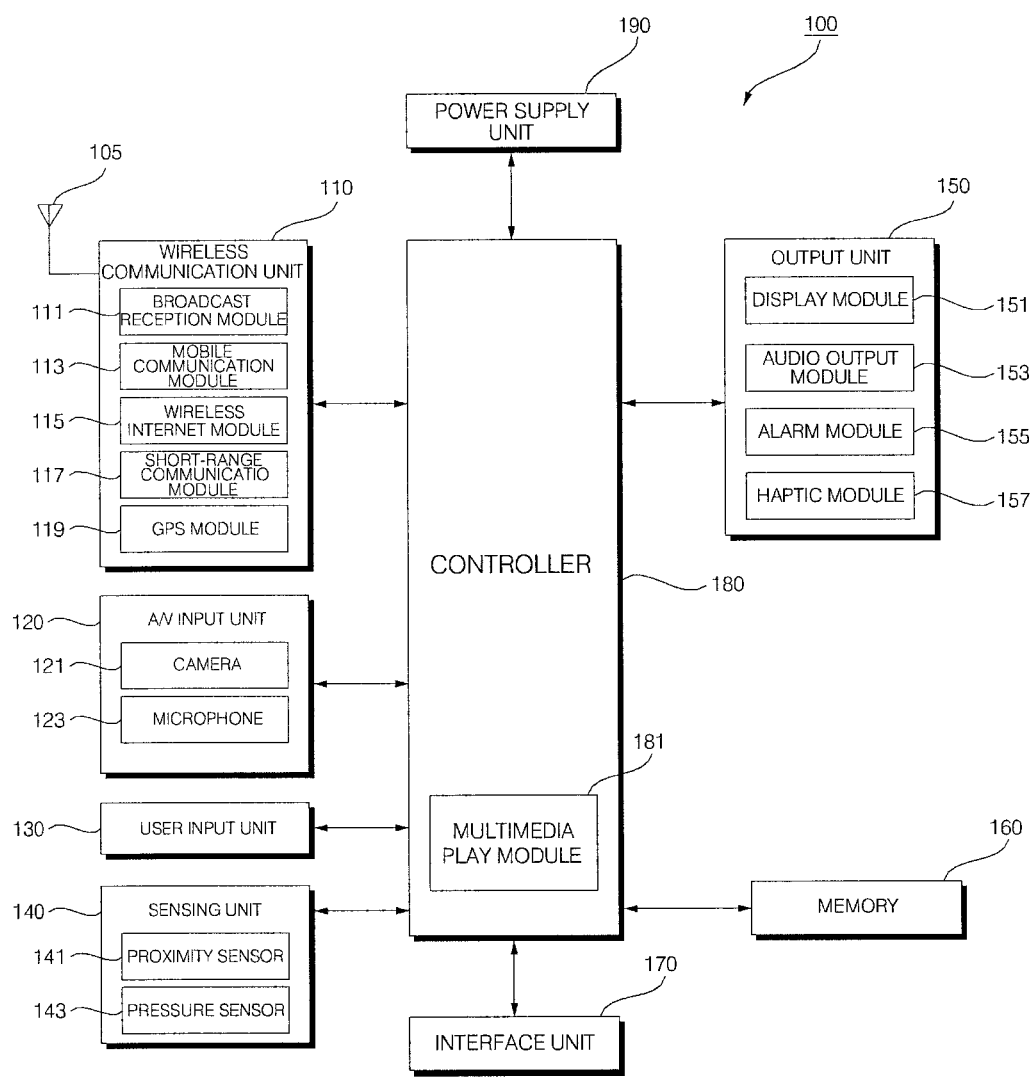
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet techniques such as wireless fidelity (WiFi), wireless broadband (Wibro), world interoperability for microwave access (Wimax) or high-speed downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141 and a pressure sensor 143. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may detect whether pressure is applied to the mobile terminal 100 and may determine the magnitude of pressure applied to the mobile terminal 100. The pressure sensor 143 may be installed in part of the mobile terminal 100 where the detection of pressure is necessary. If the pressure sensor 143 is installed in the display module 151, a touch input and a pressure-touch input, which is generally obtained by applying more pressure than is needed to generate an ordinary touch input, may be easily differentiated from each other based on a signal output by the pressure sensor 143. The signal output by the pressure sensor 143 may also indicate the magnitude of pressure applied to the display module 151.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device. If the mobile terminal 100 is connected to an external cradle, power may be supplied from the external cradle to the mobile terminal through the interface unit 170, and various command signals may be transmitted from the external cradle to the mobile terminal through the interface unit 170.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
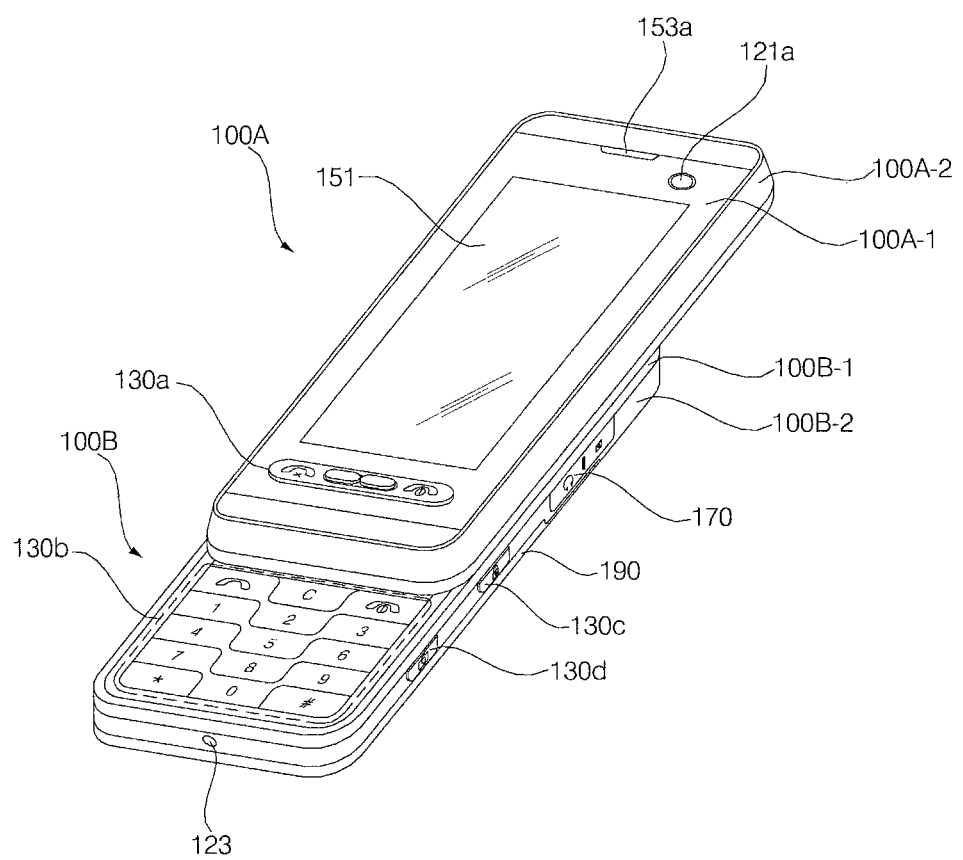
FIG. 2 illustrates a front perspective view of the mobile terminal shown in FIG.

FIG. 2 illustrates a front perspective view of the mobile terminal 100 shown in FIG. 1. Referring to FIG. 2, the mobile terminal 100 may include a first body 100A and a second body 100B. The first and second bodies 100A and 100B may be configured to be able to slide up and down on each other.

When the mobile terminal 100 is closed, the first body 100A and the second body 100B overlap each other. On the other hand, referring to FIG. 2, when the mobile terminal 100 is open, the second body 100B may be at least partially exposed below the first body 100A.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

The exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the rear case 100A-2 may be formed of a synthetic resin through injection molding. Alternatively, the first front case 100A-1 and the rear case 100A-2 may be formed of a metal such as stainless steel (STS) or titanium (Ti).

The display module 151, a first audio output module 153*a*, a first camera 121*a* and a first user input unit 130*a* may be disposed in the first front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible to input various information to the mobile terminal 100 simply by touching the display module 151.

The first audio output module 153*a* may be implemented as a receiver or a speaker. The first camera 121*a* may be configured to capture a still image or a moving image of the user.

The exterior of the second body 100 may be defined by a second front case 100B-1 and a second rear case 100B-2. A second user input unit 130*b* may be disposed at the front of the second front case 100B-1. Third and fourth user input units 130*c* and 130*d*, the microphone 123 and the interface unit 170 may be disposed in the second front case 100B-1 or the second rear case 100B-2.

The first through fourth user input units 130*a* through 130*d* may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130*a* may allow the user to input commands (such as 'start', 'end', and 'scroll'), the second user input unit 130*b* may allow the user to input numerals, characters and/or symbols, and the third and fourth user input units 130*c* and 130*d* may be used as hot keys for activating certain functions of the mobile terminal 100.

The microphone 123 may be configured to properly receive the voice of the user or other sounds.

Figure 3:
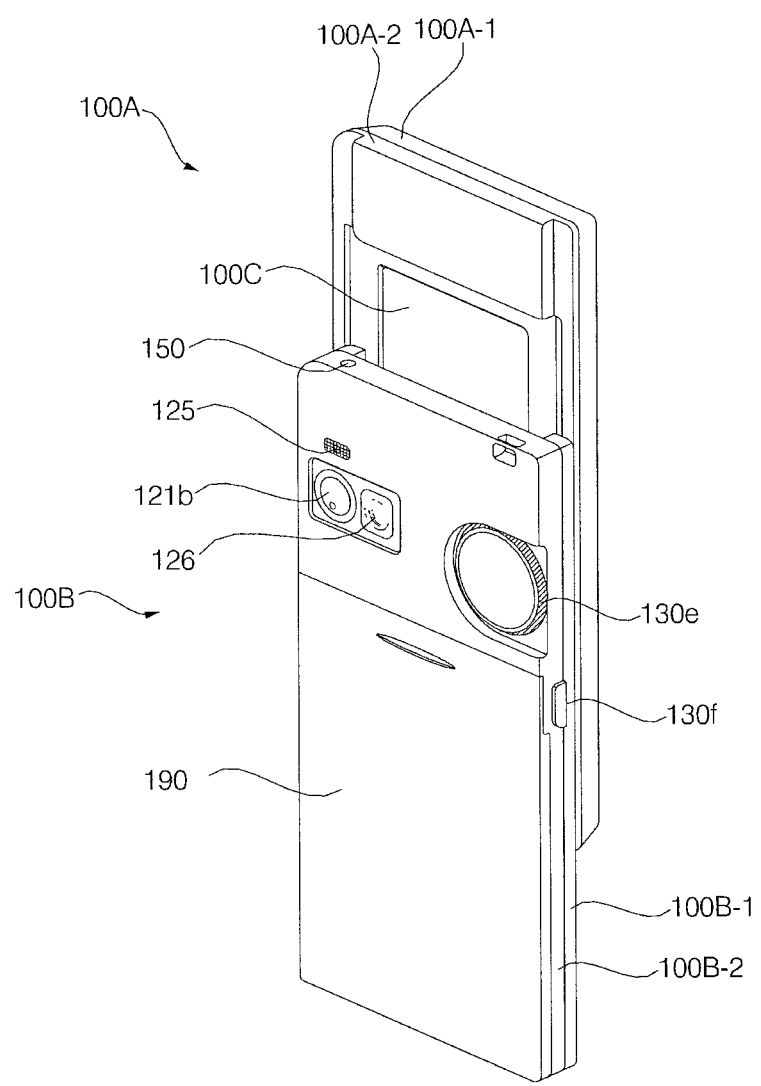
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fifth user input unit 130*e* and a second camera 121*b* may be disposed at the rear of the second rear case 100B-2 of the second body 100B. The fourth user input unit 130*d* may be of a wheel type. A sixth user input unit 130*f* may be disposed on one side of the second body 100B.

The second camera 121*b* may have a different photographing direction from that of the first camera 121*a* shown in FIG. 2. In addition, the first and second cameras 121*a* and 121*b* may have different resolutions. For example, the first camera 121*a* may be used to capture and then transmit an image of the face of the user during a video call. Thus, a low-resolution camera may be used as the first camera 121*a*. The second camera 121*b* may be used to capture an image of an ordinary subject. In this case, the image captured by the second camera 121*b* may not need to be transmitted. Thus, a high-resolution camera may be used as the second camera 121*b*.

A camera flash 125 and a mirror 126 may be disposed near the second camera 121*b*. The camera flash 125 may illuminate a subject when the second camera 121*b* captures an image of the subject. The user may look in the mirror 126 and prepare himself or herself for taking a self shot.

A second audio output module (not shown) may be additionally provided in the second rear case 100B-2. The second audio output module may realize a stereo function along with the first audio output module 153a. The second audio output module may also be used during a speaker-phone mode.

An antenna (not shown) for receiving a broadcast signal may be disposed on one side of the second rear case 100B-2. The antenna may be installed so as to be able to be pulled out of the second rear case 100B-2. A slide module 100C may be disposed between the first body 100A and the second body 100B and may couple the first body 100A and the second body 100B so as to be able to slide up and down on each other. Referring to FIG. 3, when the mobile terminal 100 is open, part of the slide module 100C may be exposed on the first rear case 100A-2 of the first body, and the rest of the slide module 100C may be hidden by the second front case 100B-1 of the second body 100B.

The second camera 121b and the fourth and fifth user input units 130d and 130e are illustrated in FIG. 3 as being provided on the second body 100B, but the present invention is not restricted to this. For example, at least one of the second camera 121b and the fourth and fifth user input units 130d and 130e may be mounted on the first body 100A, and particularly, the first rear case 100A-2. In this case, whichever of the second camera 121b and the fourth and fifth user input units 130d and 130e are mounted on the first rear case 100A-2 may be protected by the second body 100B.

In addition, the first camera 121a may be configured to be rotatable and thus to cover the photographing direction of the second camera 121b. In this case, the second camera 121b may be optional.

The power supply unit 190 may be disposed in the first rear case 100A-2. The power supply unit may be a rechargeable battery and may be coupled to the first rear case 100A-2 so as to be attachable to or detachable from the first rear case 100A-2.

Figure 4:
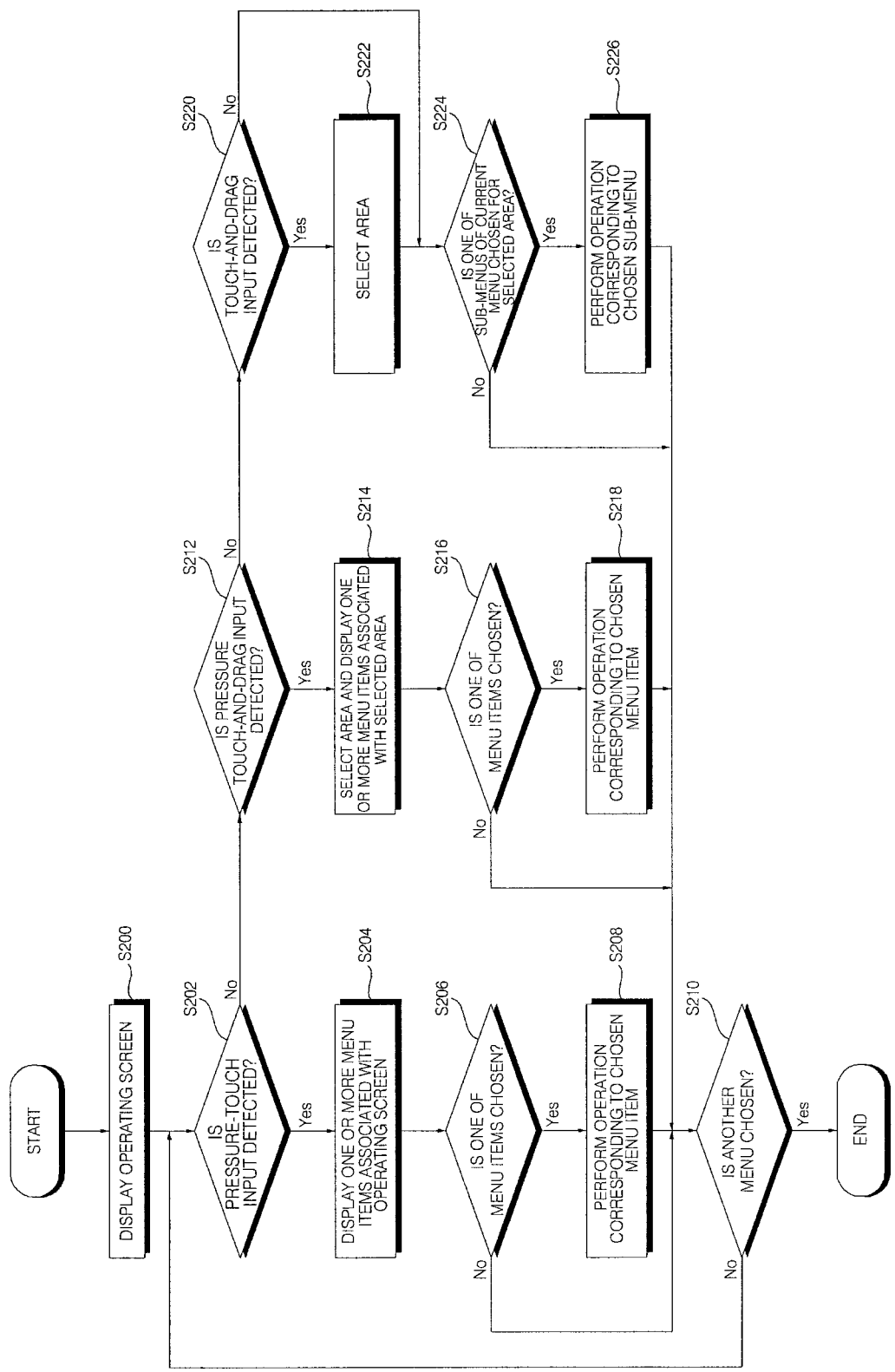
FIG. 4 illustrates a flowchart of a method of controlling a mobile terminal according to a first exemplary embodiment of the present invention.

FIG. 4 illustrates a flowchart of a method of controlling a mobile terminal according to a first exemplary embodiment of the present invention. Referring to FIG. 4, the controller 180 may display an operating screen corresponding to a menu chosen by the user on the display module 151, which includes a touch screen (S200). The operating screen may be an idle screen, a map screen, a webpage screen or an image screen.

Thereafter, if a pressure-touch input is detected from the operating screen (S202), the controller 180 may display one or more menu items that can be executed in association with the operating screen on the display module 151 (S204). A pressure-touch input may be generated when the user touches the display module 151 with more pressure than needed to generate an ordinary touch input. The controller 180 may determine what part of the display module 151 has been pressure-touched and the magnitude of the pressure based on a signal provided by the pressure sensor 153, which is installed in the display module 151. The menu items displayed in operation S204 may differ from one menu to another menu.

If one of the menu items displayed in operation S204 is chosen in response to the same pressure-touch input as that detected in operation S202 (S206), the controller 180 may control an operation corresponding to the chosen menu item (S208). More specifically, each of the menu items displayed in operation S204 may be chosen by varying the level of pressure with which the display module 151 is pressure-touched. For example, the user may choose each of the menu items displayed in operation S204 by pressing down on the display module 151 hard or gently. Alternatively, each of the menu items displayed in operation S204 may be chosen in response to an ordinary touch input.

On the other hand, if a pressure touch-and-drag input is detected from the operating screen (S212), the controller 180 may select an area of the operating screen corresponding to a drag distance of the first pressure touch-and-drag input, i.e., the distance dragged on the display module 151, and may display one or more menu items that can be executed in association with the selected area (S214). The menu items displayed in operation S214 may vary according to a drag direction, i.e., the direction in which the user drags his or her finger on the display module 151.

If one of the menu items displayed in operation S214 is chosen in response to the same pressure touch-and-drag input as that detected in operation S212 (S216), the controller 180 may control an operation corresponding to the chosen menu item (S218). More specifically, each of the menu items displayed in operation S204 may be chosen by varying the level of pressure with which the display module 151 is pressure-touched and then dragged.

On the other hand, if a touch-and-drag input is detected from the operating screen (S220), the controller 180 may select an area of the operating screen corresponding to a drag distance of the touch-and-drag input. Thereafter, if one of a number of sub-menus of the current menu is chosen for the selected area (S224), the controller 180 may control an operation corresponding to the chosen sub-menu menu to be performed on the selected area (S226).

Operations S202 through S226 may be repeatedly performed until the user chooses another menu (S210).

In this manner, it is possible to effectively control various operations performed by the mobile terminal 100 not only using an ordinary touch input but also using a pressure-touch input and a pressure touch-and-drag input.

Figure 5:
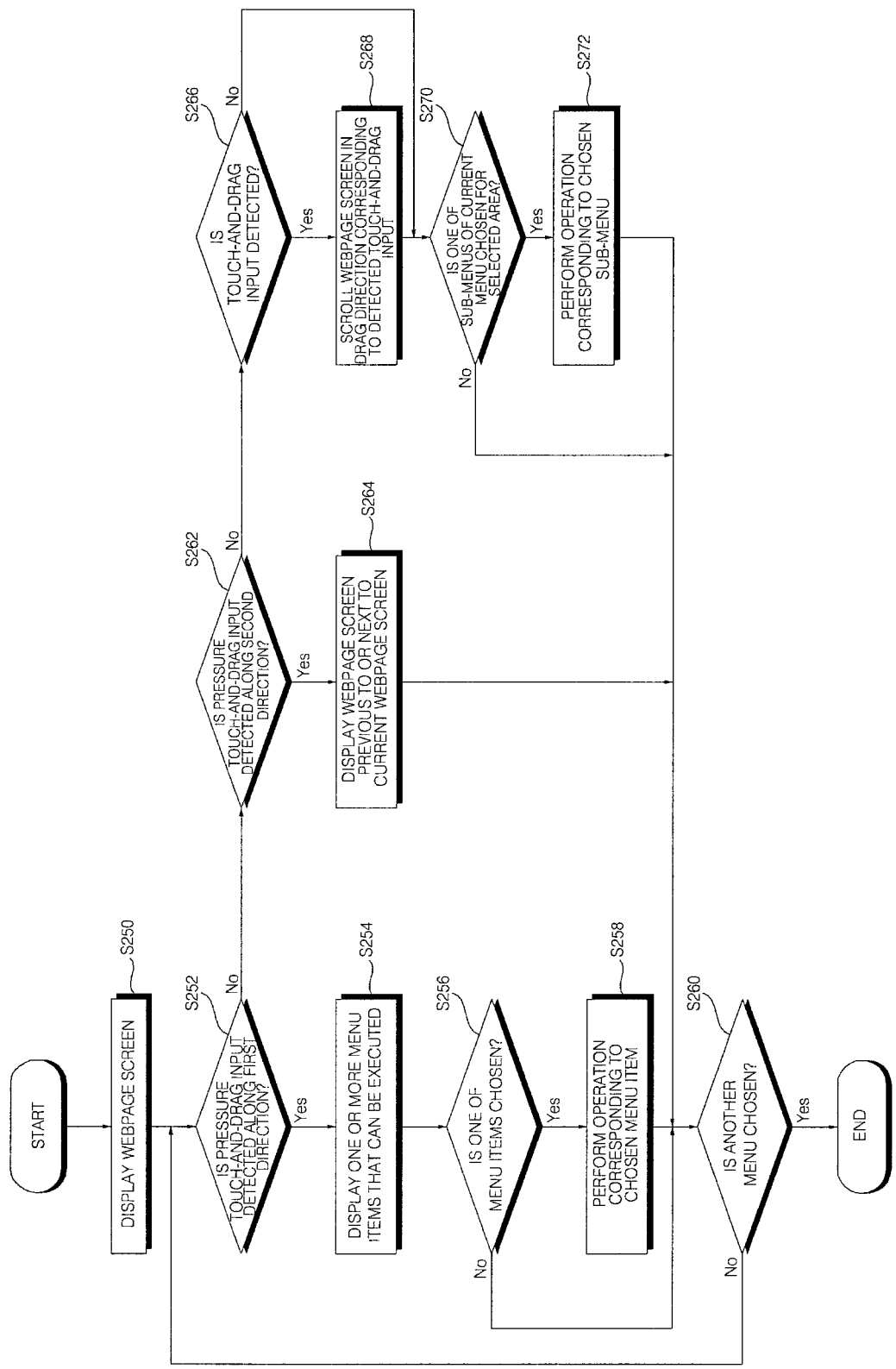
FIG. 5 illustrates a flowchart of a method of controlling a mobile terminal according to a second exemplary embodiment of the present invention.

FIG. 5 illustrates a flowchart of a method of controlling a mobile terminal according to a second exemplary embodiment of the present invention. More specifically, FIG. 5 illustrates how to control various operations in response to a pressure-touch input when a webpage screen is displayed on the display module 151. Referring to FIG. 5, if a menu for accessing the internet is chosen in response to a user command, the controller 180 may drive a web browser and display a webpage (hereinafter referred to as the current webpage) provided by a website accessed by the user on the display module 151 (S250). Thereafter, if a pressure touch-and-drag input is detected, along a first direction (e.g., a vertical direction), from the current webpage (S252), the controller 180 may display one or more menu items that can be executed in association with the current webpage (S254).

If one of the menu items displayed in operation S254 is chosen in response to the same pressure touch-and-drag input as that detected in operation S252 (S256), the controller 180 may control an operation corresponding to the chosen menu item to be performed (S258). More specifically, each of the menu items displayed in operation S254 may be chosen by varying the level of pressure with which the display module 151 is pressure-touched and then dragged.

On the other hand, if a pressure touch-and-drag input is detected, along a second direction (e.g., a horizontal direction), from the current webpage (S262), the controller 180 may display either a webpage previous to the current webpage or a webpage next to the current webpage on the display module 151 (S264).

On the other hand, if a touch-and-drag input is detected from the current webpage (S266), the controller 180 may scroll the current webpage in a drag direction corresponding to the touch-and-drag input (S268).

If one of a number of sub-menus of the current menu is chosen (S270), the controller 180 may control an operation corresponding to the chosen operation control menu to be performed (S272).

Operations S252 through S272 may be repeatedly performed until the user chooses another menu.

The second exemplary embodiment has been described, taking a webpage screen as an example. However, the second exemplary embodiment can also be applied to various situations where it is necessary to jump from one screen to another screen.

Figure 6:
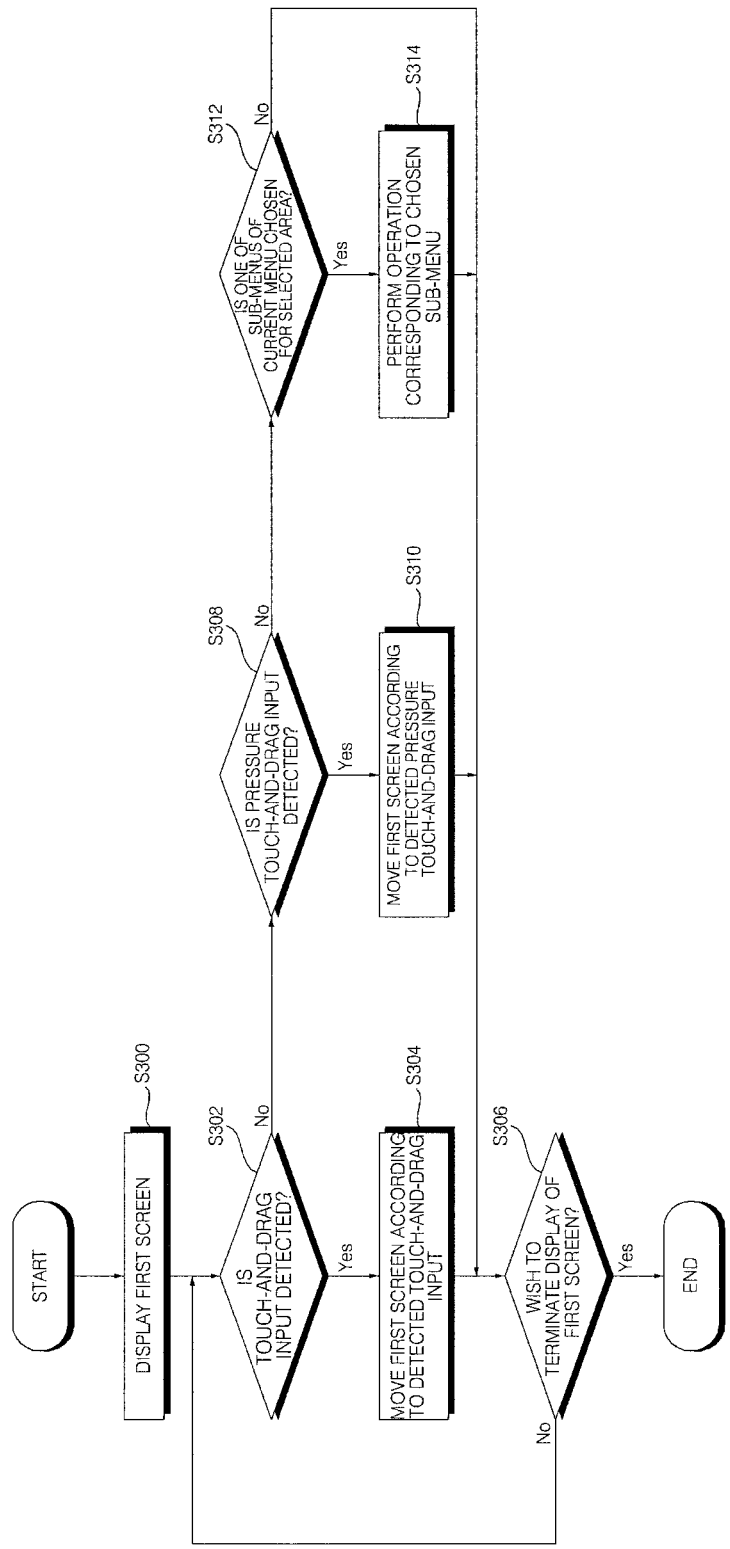
FIG. 6 illustrates a flowchart of a method of controlling a mobile terminal according to a third exemplary embodiment of the present invention.

FIG. 6 illustrates a flowchart of a method of controlling a mobile terminal according to a third exemplary embodiment of the present invention. More specifically, FIG. 6 illustrates how to jump from one screen to another screen in response to a pressure touch-and-drag input or an ordinary touch-and-drag input. Referring to FIG. 6, the controller 180 may display a first screen corresponding to a menu chosen by the user on the display module 151 (S300). The first screen may be a map screen or an image screen.

Thereafter, if a touch-and-drag input is detected from the first screen (S302), the controller 180 may move the first screen in a drag direction corresponding to the detected touch-and-drag input by an amount corresponding to a drag distance of the detected touch-and-drag input (S304).

On the other hand, if a pressure touch-and-drag input is detected from the first screen (S308), the controller 180 may move the first screen in a drag direction corresponding to the touch-and-drag input by a distance corresponding to the magnitude of pressure corresponding to the detected pressure touch-and-drag input (S310). The higher the level of pressure applied to the display module 151 in association with the detected pressure touch-and-drag input, the greater the distance by which the first screen is moved.

If one of a number of sub-menus of the current menu is chosen (S312), the controller 180 may control an operation corresponding to the chosen operation control menu to be performed (S314).

Operations S302 through S314 may be repeatedly performed until the user chooses to terminate the display of the first screen (S306).

In this manner, it is possible to quickly navigate from one screen to another screen in response to a pressure touch-and-drag input or an ordinary touch-and-drag input.

Figure 7:
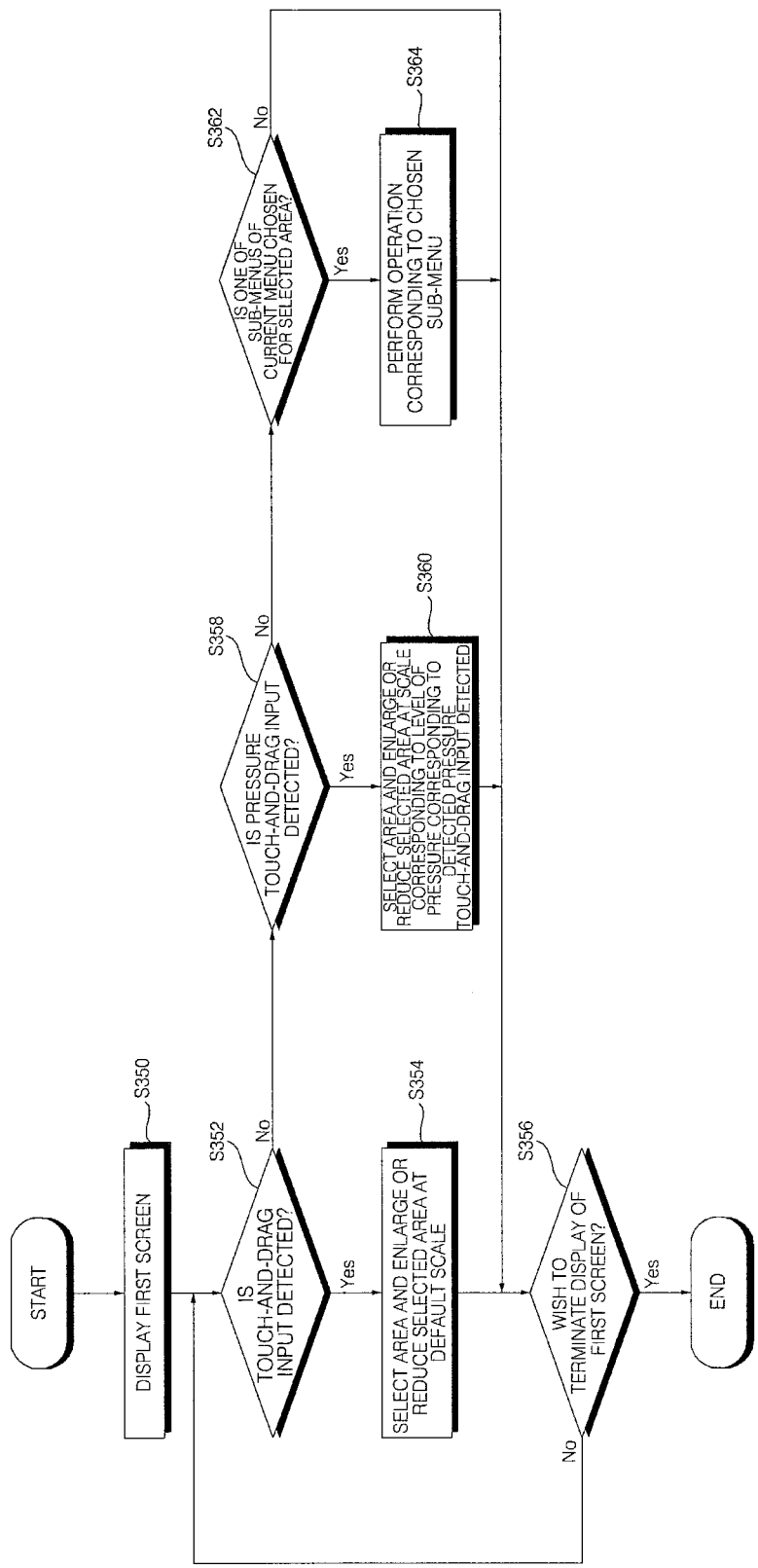
FIG. 7 illustrates a flowchart of a method of controlling a mobile terminal according to a fourth exemplary embodiment of the present invention.

FIG. 7 illustrates a flowchart of a method of controlling a mobile terminal according to a fourth exemplary embodiment of the present invention. More specifically, FIG. 7 illustrates how to enlarge or reduce a selected area in response to a pressure touch-and-drag input or an ordinary touch-and-drag input. Referring to FIG. 7, the controller 180 may display a first screen corresponding to a menu chosen by the user on the display module 151, which includes a touch screen (S350).

Thereafter, if a touch-and-drag input is detected from the first screen (S352), the controller 180 may select an area of the first screen corresponding to a drag distance of the touch-and-drag input and may display the selected area at a default scale (S354). As a result, the selected area may be enlarged or reduced.

On the other hand, if a pressure touch-and-drag input is detected from the first screen (S358), the controller 180 may display the selected area at a scale corresponding to the magnitude of pressure applied to the display module 151 for generating the detected pressure touch-and-drag input (S360). The higher the level of pressure applied to the display module 151 in association with the detected pressure touch-and-drag input, the greater the degree to which the selected area is enlarged or reduced.

If one of a number of sub-menus of the current menu is chosen (S362), the controller 180 may control an operation corresponding to the chosen operation control menu to be performed (S364).

Operations S352 through S364 may be repeatedly performed until the user chooses to terminate the display of the first screen (S356).

In this manner, it is possible to quickly enlarge or reduce a selected area of a screen displayed on the display module 151 in response to a pressure touch-and-drag input or an ordinary touch-and-drag input.

Figure 8:
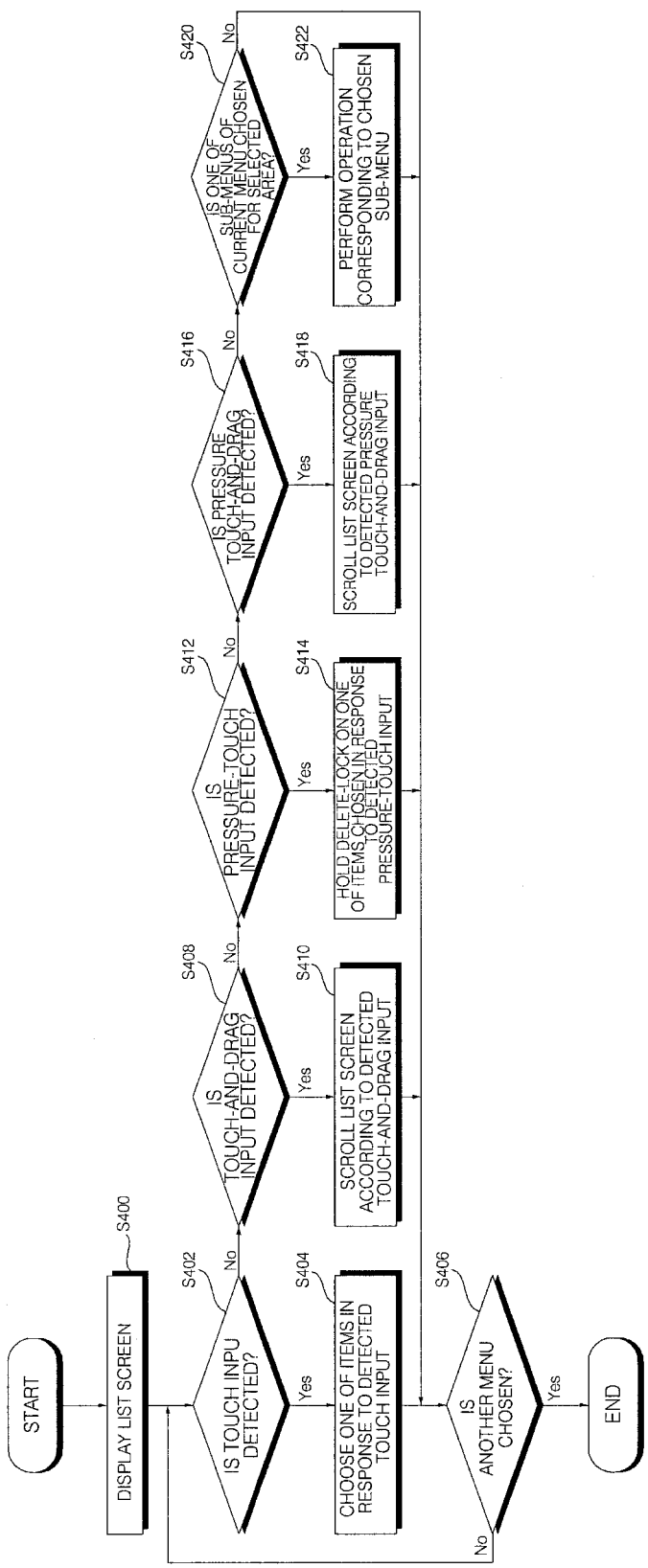
FIG. 8 illustrates a flowchart of a method of controlling a mobile terminal according to a fifth exemplary embodiment of the present invention.

FIG. 8 illustrates a flowchart of a method of controlling a mobile terminal according to a fifth exemplary embodiment of the present invention. More specifically, FIG. 8 illustrates how to control various operations performed by the mobile terminal 100 in response to a pressure-touch input and a pressure touch-and-drag input when a file list is displayed on the display module 151. Referring to FIG. 8, the controller 180 may display a list screen including a list of items corresponding to a menu chosen by the user on the display module 151, which includes a touch screen (S400).

If one of the items is touched (S402), the controller 180 may control the touched item to be chosen (S404). Once chosen, the touched item may be displayed differently from the other items so as to be easily recognizable.

On the other hand, if a touch-and-drag input is detected from the list screen (S408), the controller 180 may control the list screen to be scrolled at a default speed and scale in a drag direction corresponding to the detected touch-and-drag input (S410).

On the other hand, if one of the items is chosen in response to a pressure-touch input (S412), the controller 180 may hold a delete-lock on the chosen item so that the chosen item cannot be arbitrarily deleted in response to an ordinary 'delete' command (S414).

On the other hand, if a pressure touch-and-drag input is detected from the list screen (S416), the controller 180 may control the list screen to be scrolled at a speed and scale corresponding to the magnitude of pressure applied to the display module 151 for generating the detected pressure touch-and-drag input in a drag direction corresponding to the detected pressure touch-and-drag input (S418).

If one of a number of sub-menus of the current menu is chosen (S420), the controller 180 may control an operation corresponding to the chosen operation control menu to be performed (S422).

Operations S402 through S422 may be repeatedly performed until the user chooses another menu (S406).

In this manner, it is possible to easily hold a delete-lock on any item selected from a list screen, quickly scroll the list screen in response to a pressure touch-and-drag input and increase the scale of scrolling in response to a pressure touch-and-drag input.

FIGS. 9 through 28 illustrate diagrams for explaining the methods of the first through fifth exemplary embodiments.

Figure 9A:
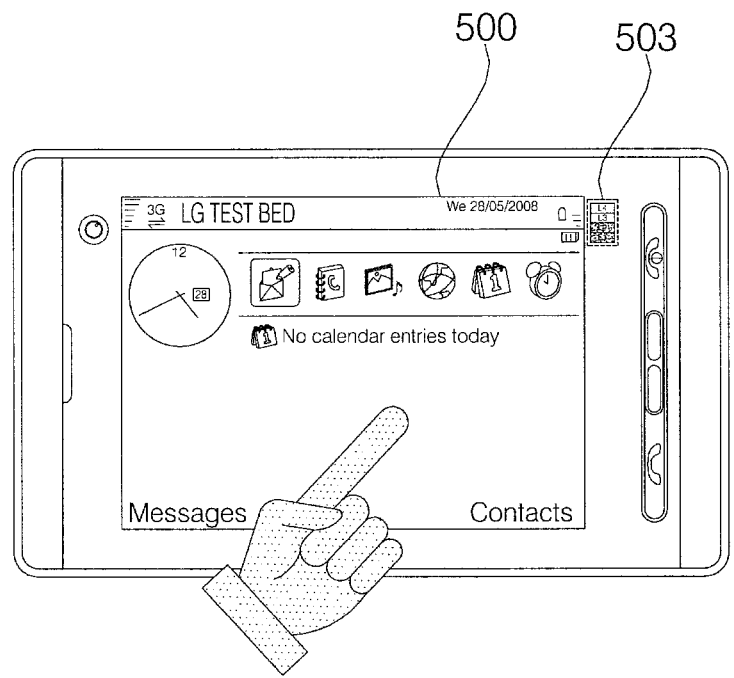
FIGS. 9A through 9C illustrate diagrams for explaining how to determine the level of pressure applied to a touch screen in association with a pressure-touch input.
Figure 9B:
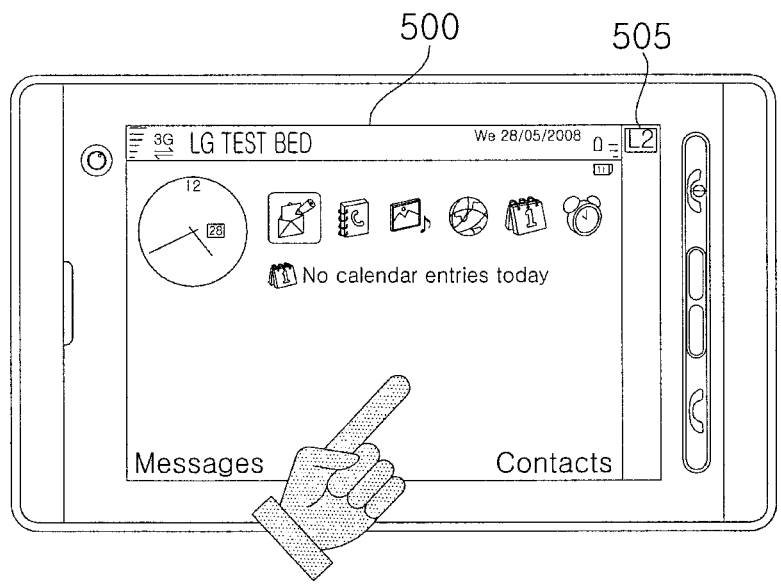
Figure 9C:
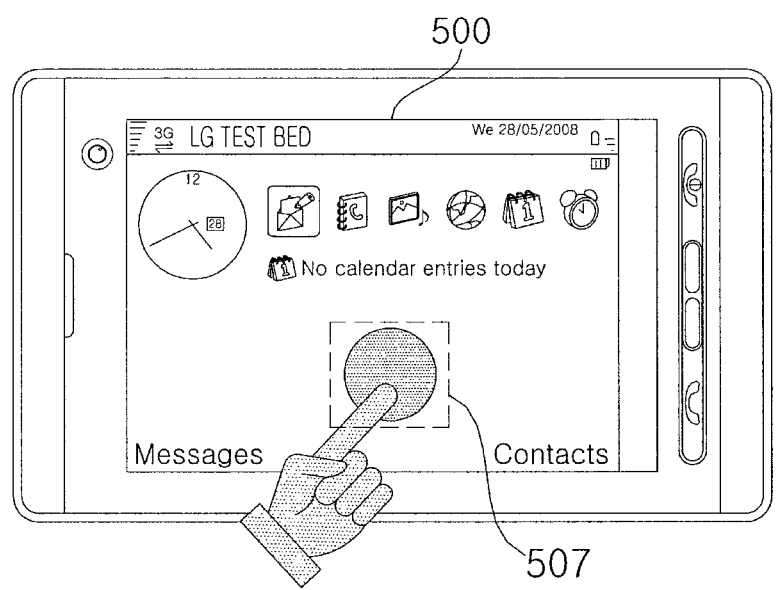
Figure 12:
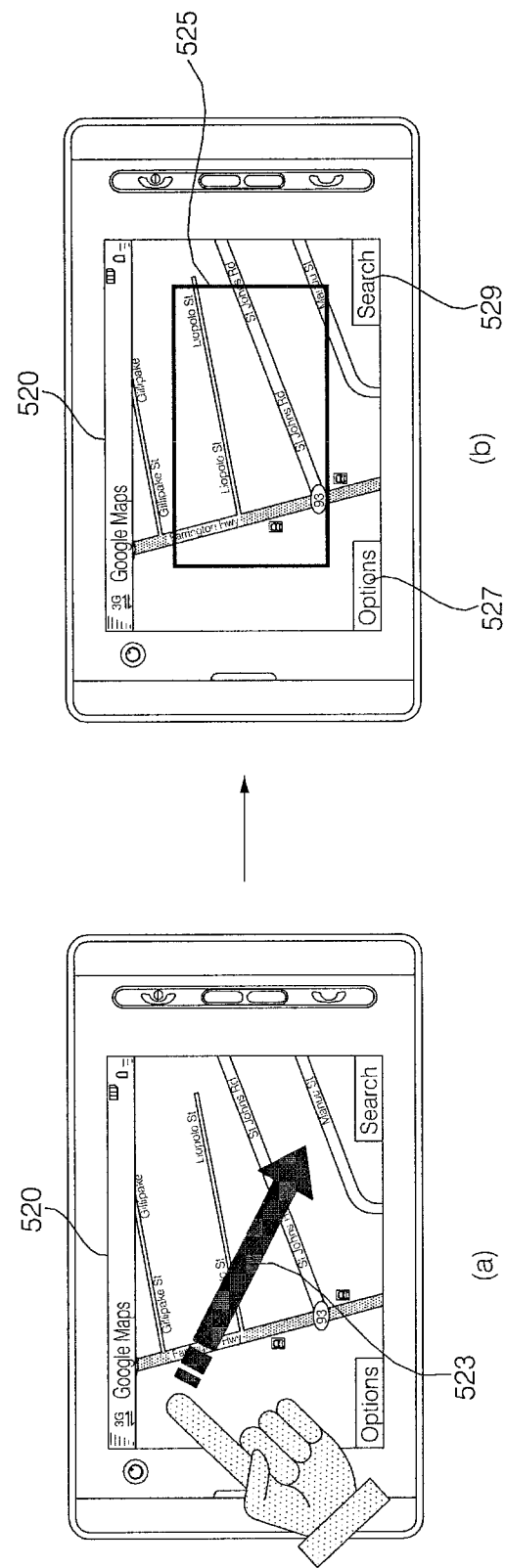
Figure 13:
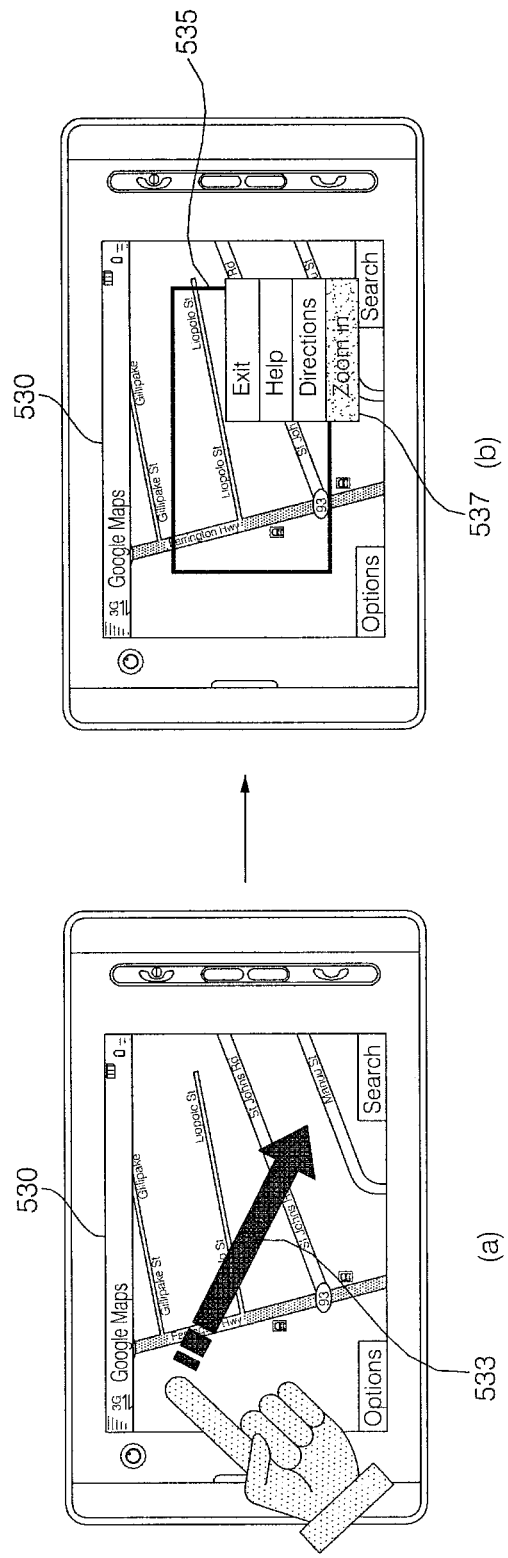
Figure 14:
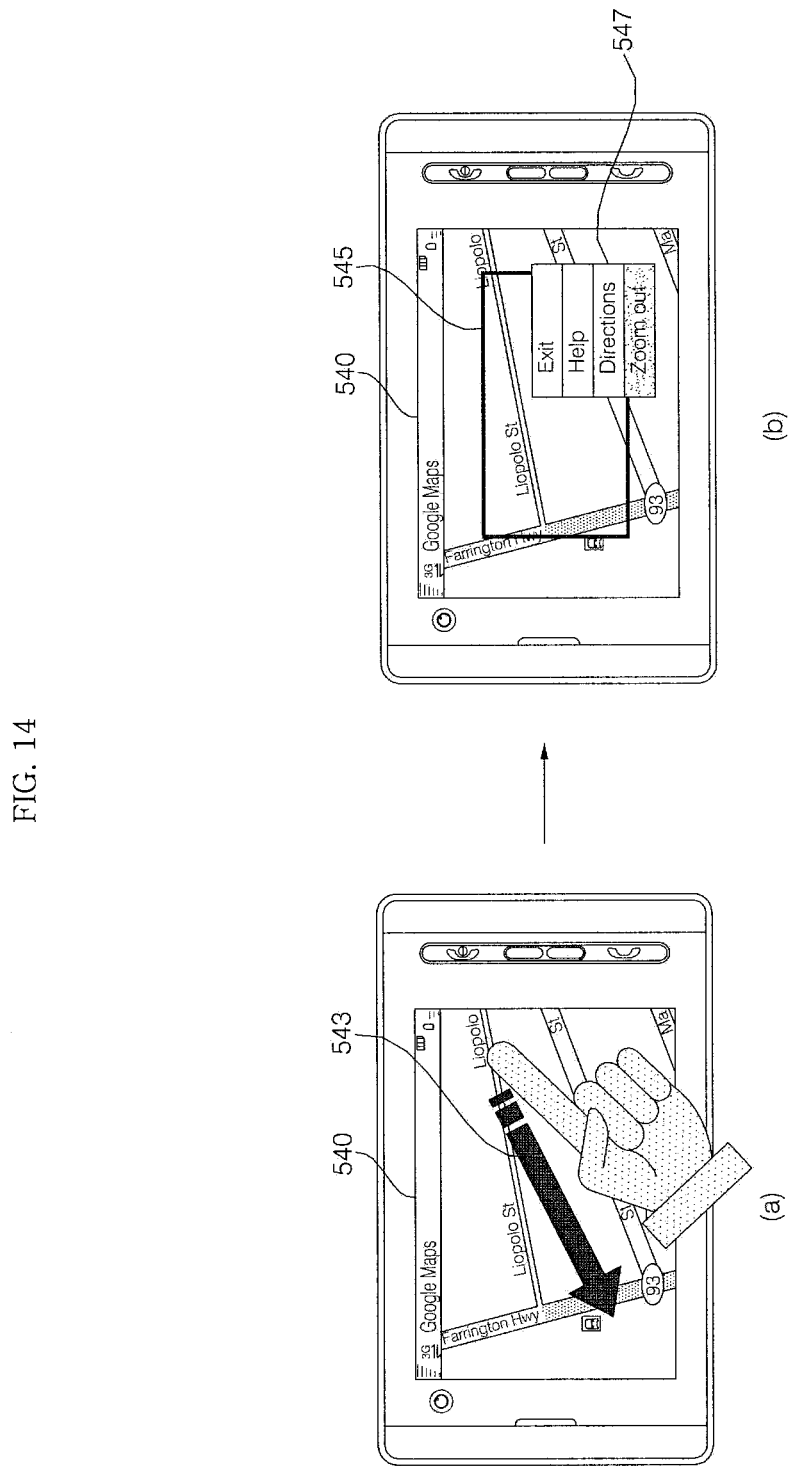
Figure 15:
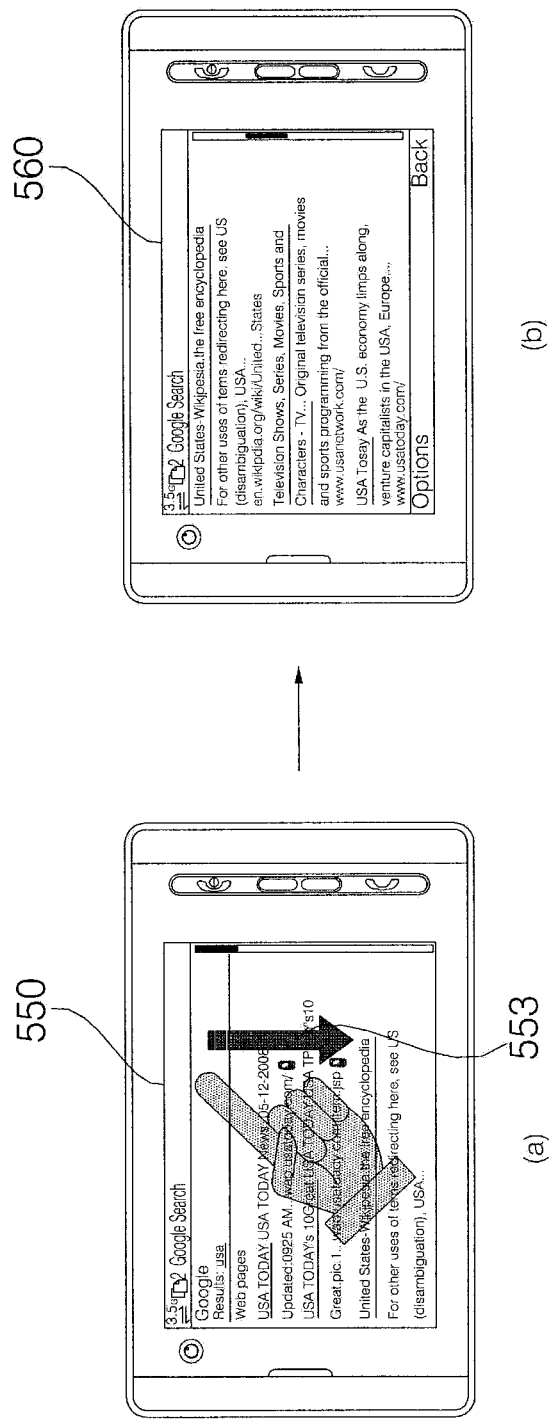
FIGS. 15 through 23 illustrate diagrams for explaining how to control various operations performed by the mobile terminal shown in FIG. 1 in response to a pressure touch-and-drag input.
Figure 16:
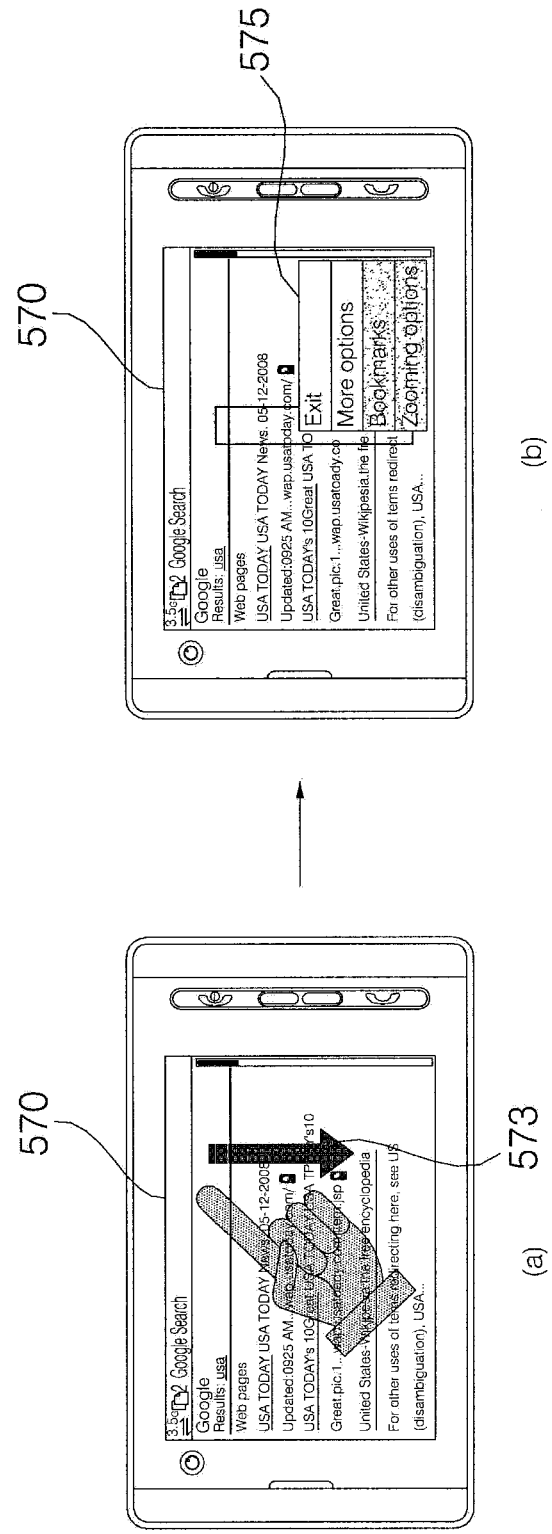
Figure 17:
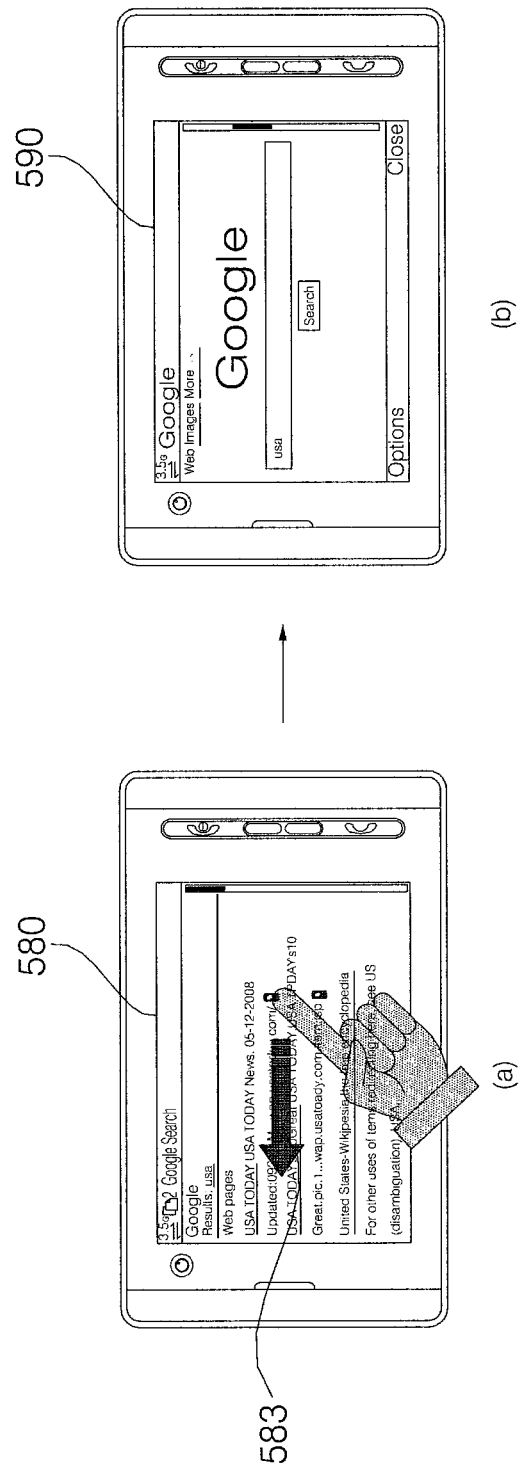
Figure 18:
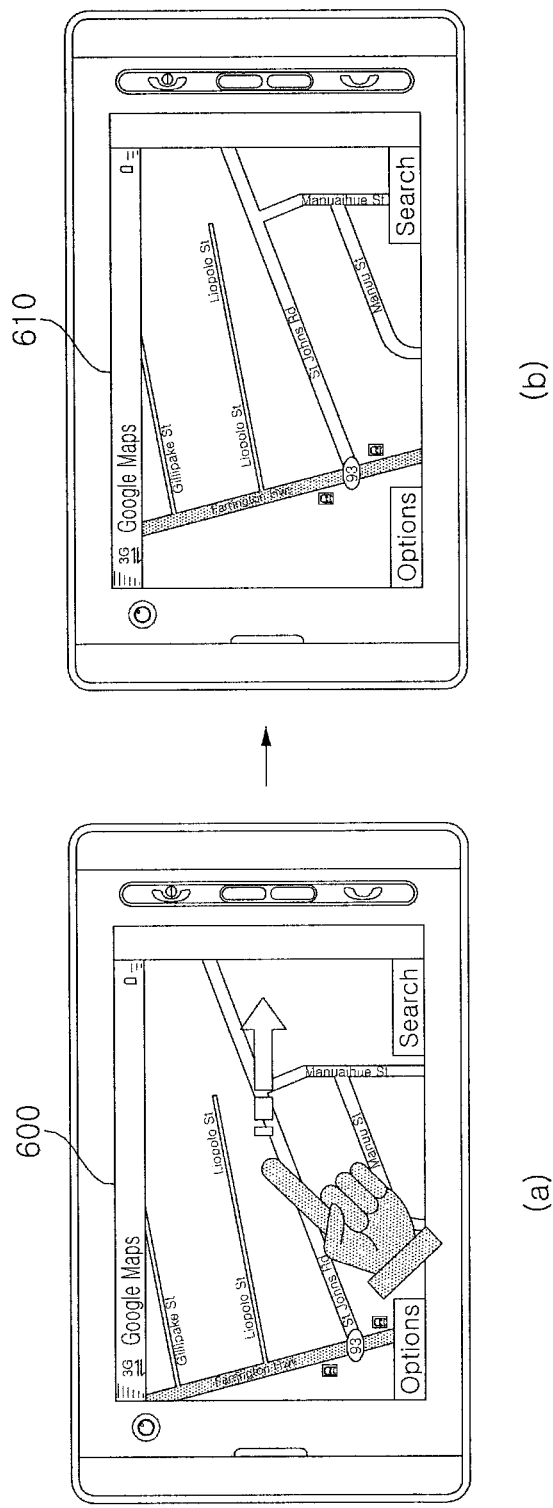
Figure 19:
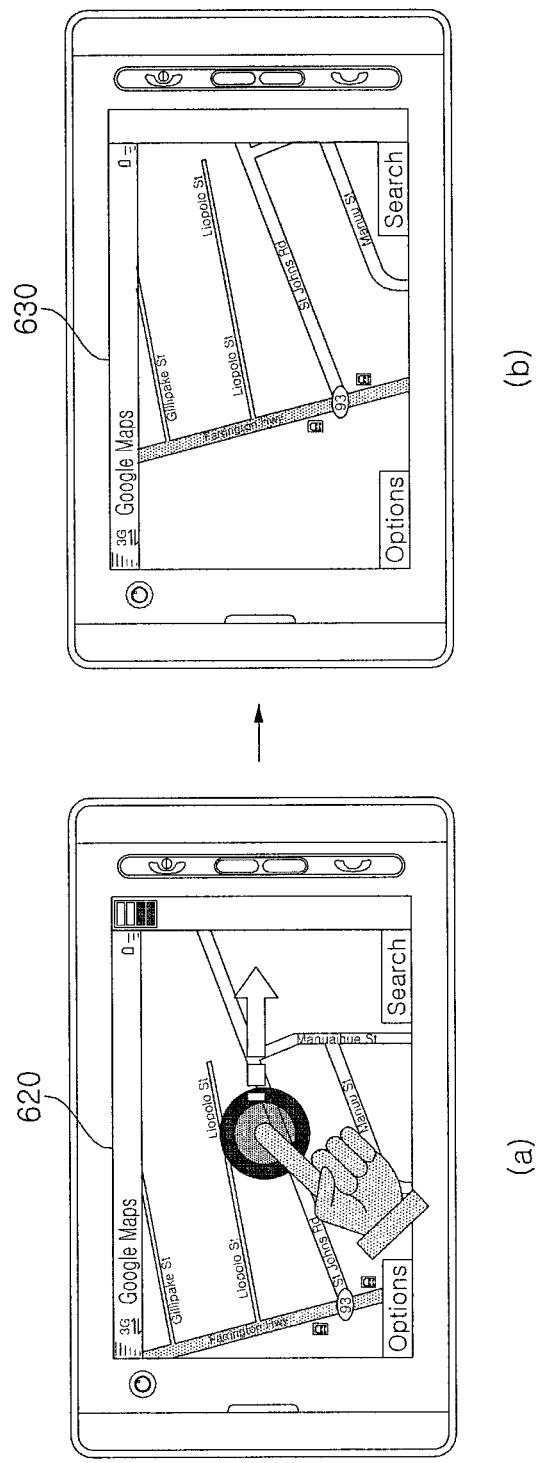
Figure 20:
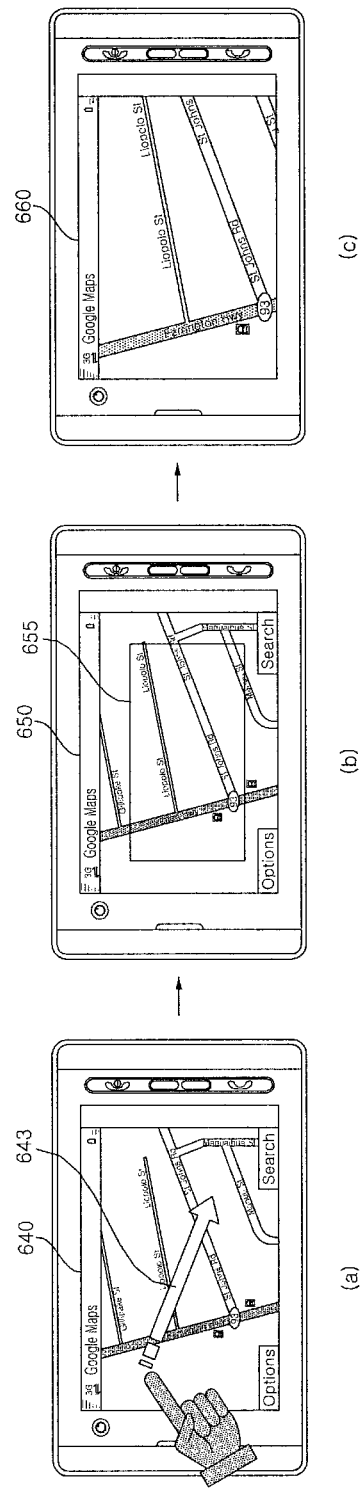
Figure 21:
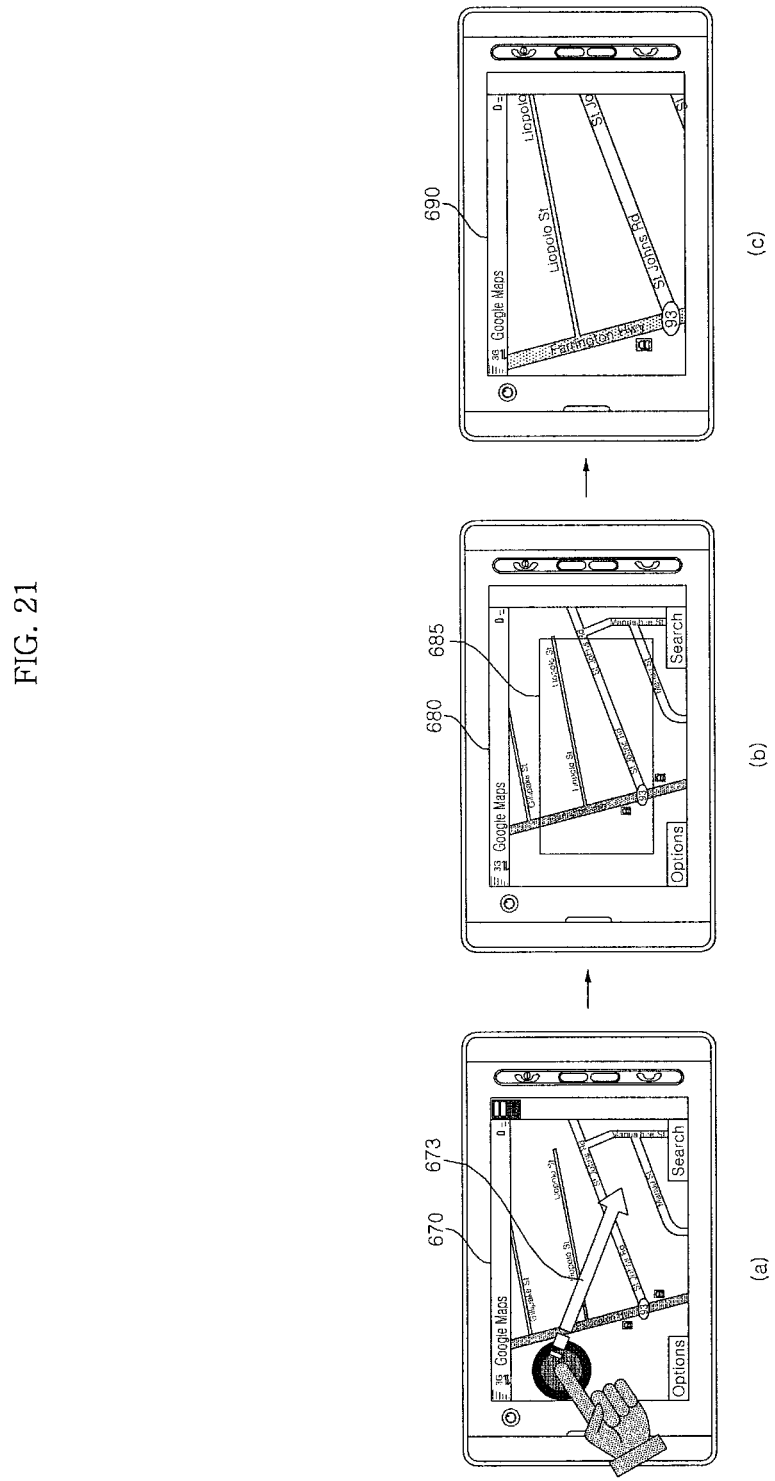
Figure 22:
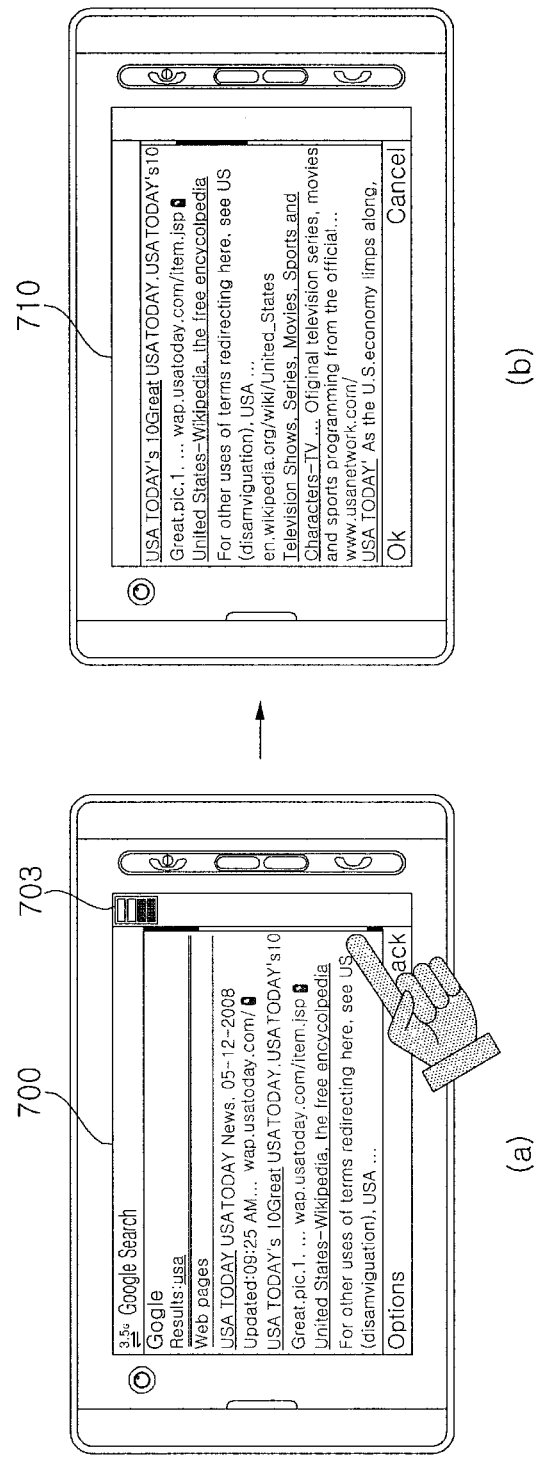
Figure 23:
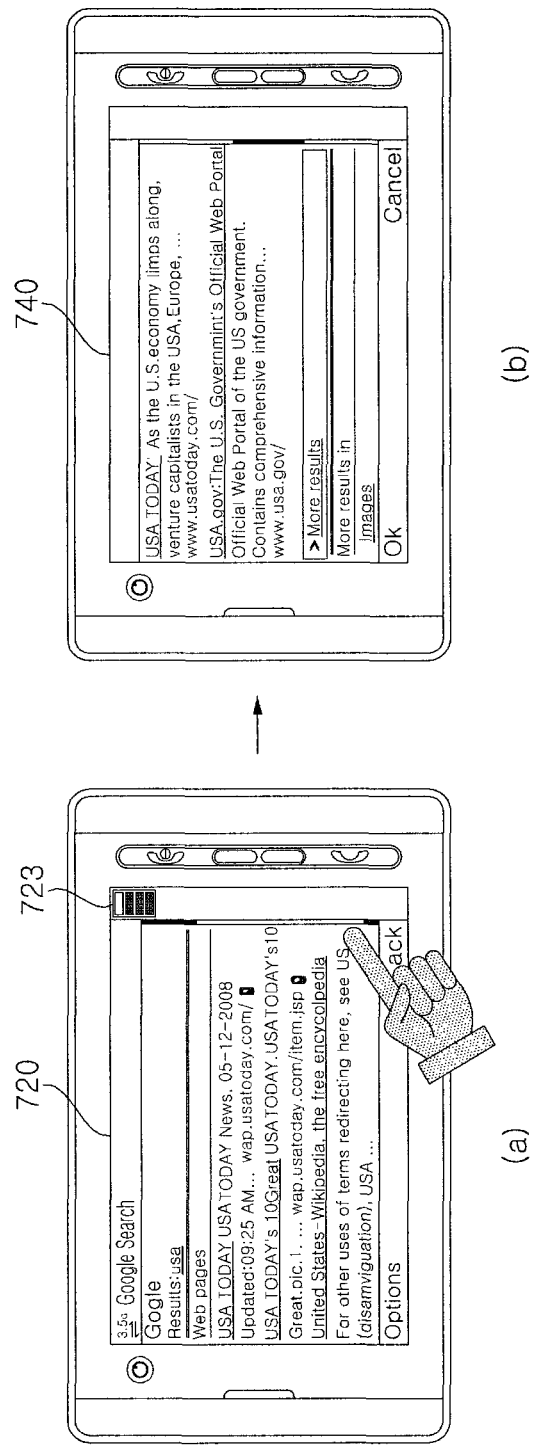

FIGS. 9A through 9C illustrate diagrams for explaining how to determine the level of pressure applied to a touch screen in association with a pressure-touch input. Referring to FIGS. 9A and 9B, the level of pressure currently being applied to the display module 151 may be classified into one of first through four levels L1 through L4. Thereafter, referring to FIG. 9A, the results of the classification may be displayed as a bar graph icon 503. Alternatively, referring to FIG. 9B, the results of the classification may be displayed as a text icon 505. Still alternatively, referring to FIG. 9C, a circular image 507 whose size varies according to the level of pressure currently being applied to the display module 151 may be displayed at an exact point on the display module 151 where the pressure is detected. Various methods other than those set forth herein may be used to indicate the level of pressure currently being applied to the display module 151.

FIGS. 10 through 14 illustrate diagrams for explaining how to display a set of menu items in response to a pressure-touch input. Referring to FIG. 10, if a navigation menu is chosen, a map screen 510 may be displayed on the display module 151, which includes a touch screen. If a pressure-touch input is detected from the map screen 510, a plurality of menu items 513 (i.e., 'Exit,' 'Details,' 'Picture,' and 'address') associated with the map screen 510 may be displayed on the display module 151. The menu items 513 may be chosen in response to different levels of pressure. For example, the 'Exit' menu item may be chosen when a first-level pressure is applied to the display module 151, the 'Details' menu item may be chosen when a second-level pressure is applied to the display module 151, the 'Picture' menu item may be chosen when a third-level pressure is applied to the display module 151, and the 'Address' menu item may be chosen when a fourth-level pressure is applied to the display module 151.

More specifically, if a pressure-touch input corresponding to the fourth-level pressure is detected from a predetermined point on the map screen 510, and thus, the 'Address' menu item is chosen, as shown in FIG. 10(a), address information 517 of a place represented by the predetermined point on the map screen 510 may be displayed on the map screen 510, as shown in FIG. 10(b).

On the other hand, if a pressure-touch input corresponding to the third-level pressure is detected from a predetermined point on the map screen 510, and thus, the 'Picture' menu item is chosen, as shown in FIG. 11(a), a picture 519 of a place represented by the predetermined point on the map screen 510 may be displayed on the map screen 510, as shown in FIG. 11(b).

Referring to FIGS. 12(a) and 12(b), if a touch-and-drag input 523 is detected from a map screen 520, an area 525 corresponding to a drag distance of the touch-and-drag input 523 may be selected from the map screen 520. Thereafter, if the user chooses one of two menu items 527 and 529 displayed at the bottom of the map screen 520, an operation corresponding to the chosen menu item may be performed.

Referring to FIGS. 13(a) and 13(b), if a pressure touch-and-drag input 533 is detected from a map screen 530, an area 535 corresponding to a drag distance of the pressure touch-and-drag input 533 may be selected from the map screen 520, and a set of menu items 537 that can be executed in association with the selected area 535 may be displayed on the map screen 530. Each of the menu items 537 may be chosen by varying the level of pressure applied to the display module 151 in association with the pressure touch-and-drag input 533. Alternatively, each of the menu items 537 may be chosen in response to an ordinary touch input.

If one of the menu items 537, i.e., a 'Zoom in' menu item, is selected from the map screen 530 of FIG. 13(b), a map screen 540 including an enlarged view of the selected area 535 may be displayed, as shown in FIG. 14(a). Thereafter, if a pressure touch-and-drag input 543 corresponding to a different drag direction from that of the pressure touch-and-drag input 533 of FIG. 13(a) is detected, a set of menu items 547, which slightly differs from the set of menu items 537 displayed in response to the pressure touch-and-drag input 533, may be displayed for a selected area 545. The set of menu items 547 may include a 'Zoom out' menu item, instead of the 'Zoom in' menu item.

FIGS. 15 through 23 illustrate diagrams for explaining how to perform various operations performed by the mobile terminal 100 in response to a pressure touch-and-drag input.

Referring to FIGS. 15(a) and 15(b), if a touch-and-drag input 533 is detected from a webpage screen 550 along a direction from the top to the bottom of the webpage screen 550, a webpage screen 560 obtained by scrolling down the webpage screen 550 may be displayed.

Referring to FIGS. 16(a) and 16(b), if a pressure touch-and-drag input 576 is detected from a webpage screen 570 along a direction from the top to the bottom of the web screen 570, a set of menu items 575 that can be executed in association with the webpage screen 570 may be displayed. Each of the menu items 575 may be chosen by varying the level of pressure applied to the display module 151 in association with the pressure touch-and-drag input 576.

Referring to FIGS. 17(a) and 17(b), if a pressure touch-and-drag input 583 is detected from a webpage screen 580 along a direction from the right to the left of the webpage screen 580, a webpage screen 590 previous to the webpage screen 580 may be displayed. On the other hand, if a pressure touch-and-drag input is detected from the webpage screen 580 along a direction from the left to the right of the webpage screen 580, a webpage screen next to the webpage screen 580 may be displayed. The user may be allowed to choose what operation is to be performed according to a drag direction corresponding to a pressure touch-and-drag input.

Referring to FIGS. 18(a) and 18(b), if a touch-and-drag input is detected from a map screen 600, a map screen 610 obtained by moving the map screen 600 in a drag direction corresponding to the touch-and-drag input by an amount corresponding to a drag distance corresponding to the touch-and-drag input may be displayed.

Referring to FIGS. 19(a) and 19(b), if a pressure touch-and-drag input is detected from a map screen 920, a map screen 930 obtained by moving the map screen 920 by an amount corresponding to the level of pressure applied to the display module 151 in association with the pressure touch-and-drag input may be displayed. The higher the level of pressure with which the display module 151 is pressure-touched, the greater the amount by which the map screen 920 is moved. Therefore, it is possible to quickly move the map screen 920 by increasing the level of pressure with which the display module 151 is pressure-touched.

Referring to FIGS. 20(a) through 20(c), if a touch-and-drag input 643 is detected from a map screen 640, an area 655 corresponding to a drag distance of the touch-and-drag input may be selected from the map screen 640, and a map screen 660 including an enlarged view of the selected area 655 may be displayed. That is, the selected area 655 may be enlarged at a default scale in response to an ordinary touch-and-drag input.

Referring to FIGS. 21(a) through 21(c), if a touch-and-drag input 673 is detected from a map screen 670, an area 685 corresponding to a drag distance of the touch-and-drag input 673 may be selected from the map screen 670, and a map screen 690 including an enlarged view of the selected area 685 may be displayed. In this case, the scale of enlargement of the selected area 685 may be determined by the level of pressure with which the selected area 685 is pressure-touched.

Referring to FIGS. 22(a) and 22(b), if a touch-and-drag input is detected from a webpage screen 700, a webpage screen 710 obtained by scrolling the webpage screen 700 in a drag direction corresponding to the touch-and-drag input may be displayed.

Referring to FIGS. 23(a) and 23(b), if a pressure touch-and-drag input is detected from a webpage screen 720, a webpage screen 740 obtained by scrolling the webpage screen 700 in a drag direction corresponding to the touch-and-drag input may be displayed. In this case, the degree and speed of scrolling the webpage screen 720 may be determined by the level of pressure with which the webpage screen 720 is pressure-touched. An icon 723 indicating the level of pressure with which the webpage screen 720 is being pressure-touched may be displayed so that the user can estimate the scale and speed of scrolling.

FIGS. 24 through 28 illustrate diagrams for explaining how to control various operations performed by the mobile terminal 100 in response to a pressure-touch input.

Figure 24:
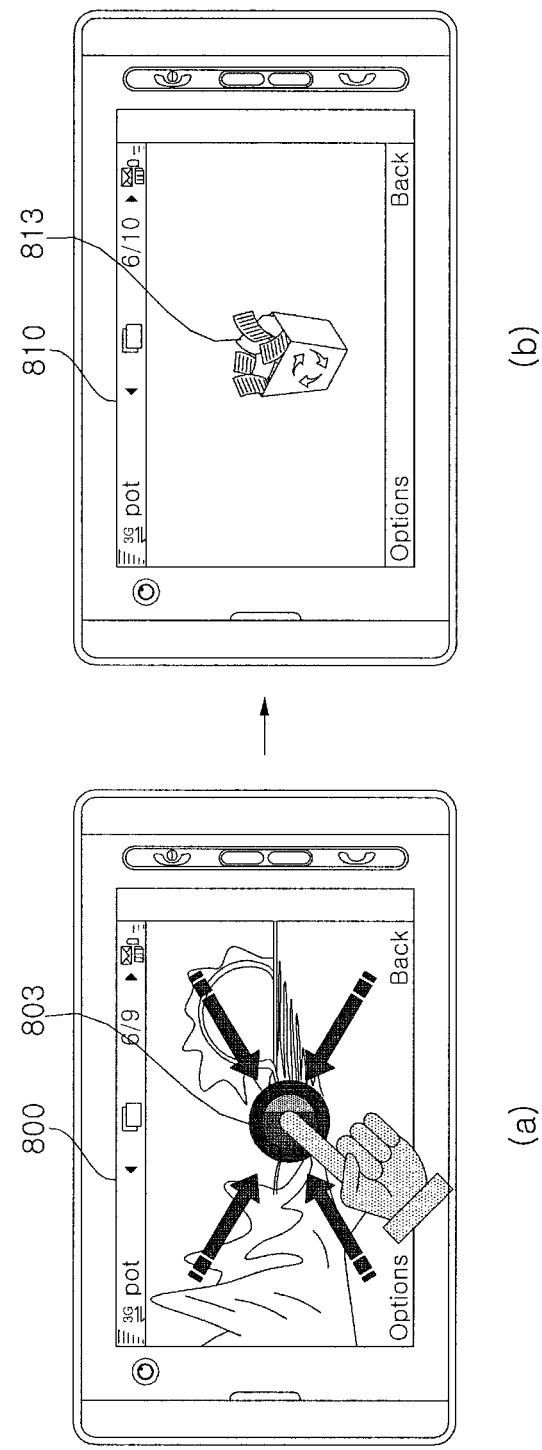
FIGS. 24 through 28 illustrate diagrams for explaining how to control various operations performed by the mobile terminal shown in FIG. 1 in response to a pressure-touch input.

Referring to FIGS. 24(*a*) and 24(*b*), if a pressure-touch input 803 is detected from a certain point on an image screen 800, an image displayed on the image screen 800 may be deleted along with an animation effect of sucking up the image into the certain point on the image screen 800. Then, a trashcan image 813 may be displayed, indicating that the image displayed on the image screen 800 has been deleted.

Figure 25:
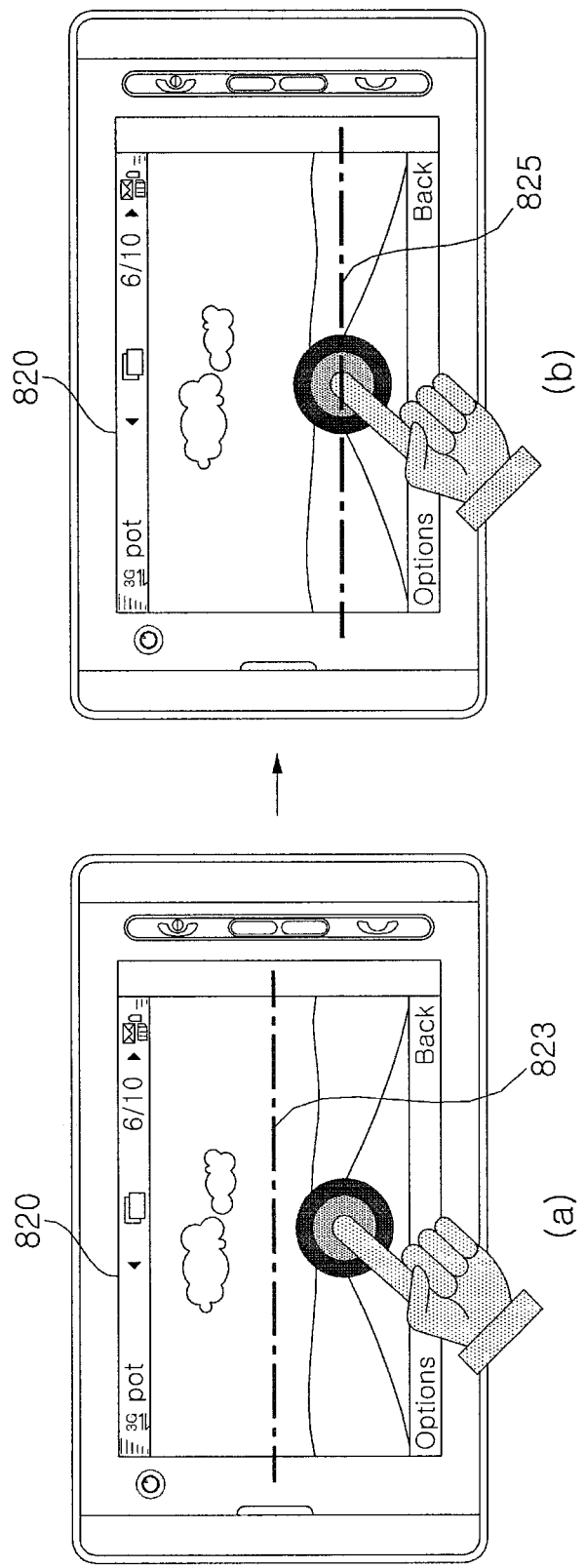

Referring to FIGS. 25(*a*) and 25(*b*), if a pressure-touch input is detected from a certain point on an image screen 820, an image displayed on the image screen 820 may be rotated about a central axis 823 of the image screen 820 or an axis passing through the certain point on the image screen 820. Alternatively, the image displayed on the image screen 820 may be rotated about one of the boundaries of the corresponding image.

Figure 26:
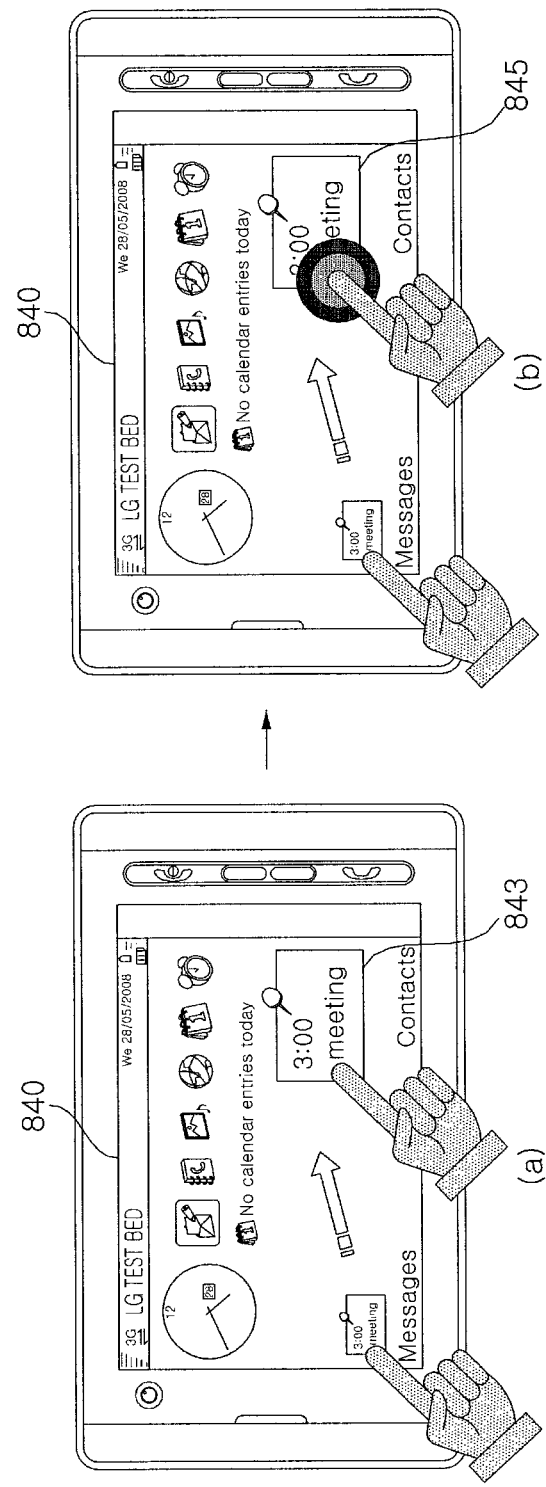

Referring to FIG. 26(*a*), if a notepad 840 is touched, the notepad 843 may become editable. Referring to FIG. 26(*b*), if the notepad 840 is pressure-touched, the position of the notepad 840 may be fixed.

Figure 27:
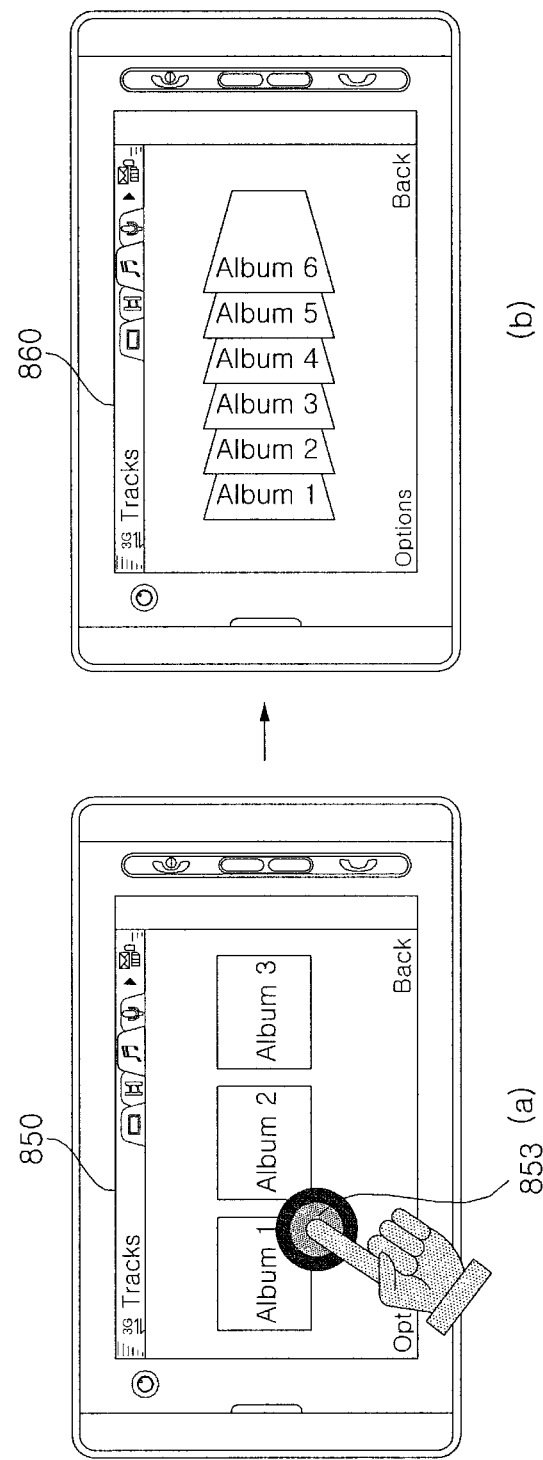

Referring to FIG. 27(*a*), if a pressure-touch input 853 is detected from a certain point on a screen 850 when a music album list including albums 1 through 3 is displayed on the screen, a screen 860 including more music albums than there are on the screen 850, i.e., including albums 1 through 6, may be displayed. In this manner, it is possible to display many music albums on a single screen. If one of the music albums displayed on the screen 850 is chosen in response to an ordinary touch input, information regarding the chosen music album may be displayed.

Figure 28:
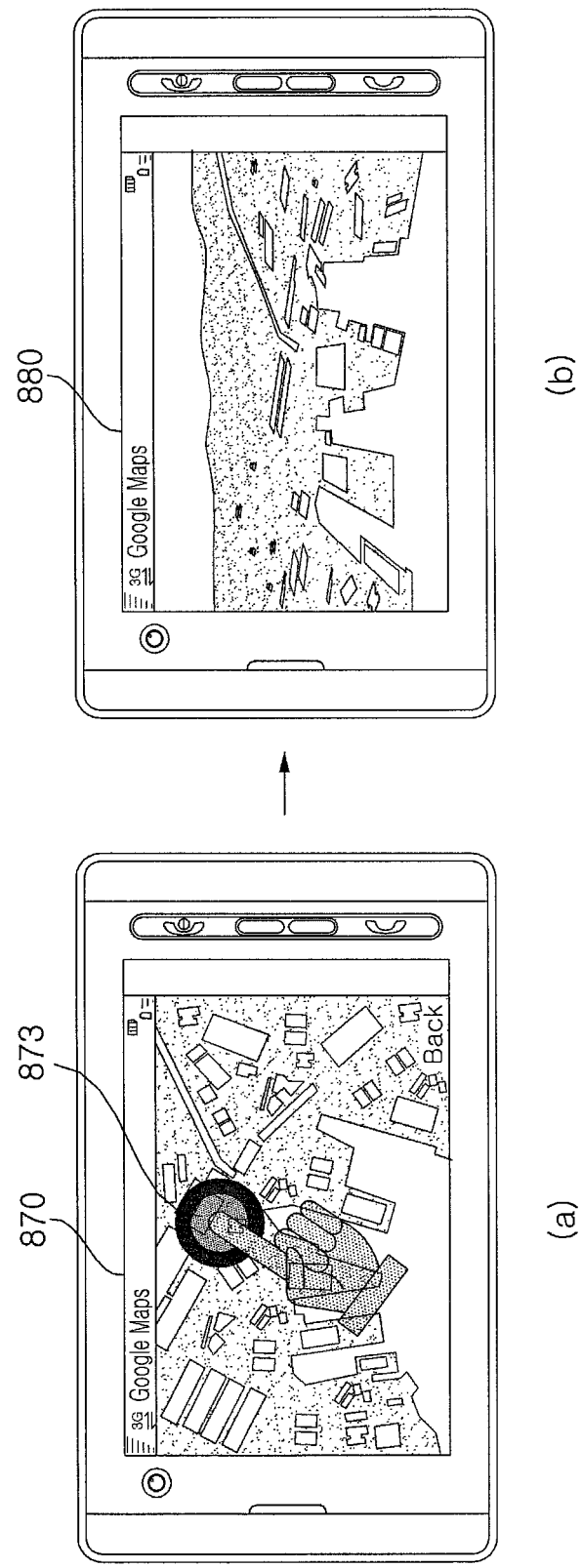

Referring to FIGS. 28(*a*) and 28(*b*), if a pressure-touch input 873 is detected from a two-dimensional (2D) map screen 870, a three-dimensional (3D) map screen 880 obtained by tilting the 2D map screen 870 may be displayed. The degree to which the 2D map screen 870 is tilted may be proportional to the level of pressure applied to the display module 151.

In this manner, it is possible to control various operations performed by the mobile terminal 100 in response to a pressure-touch input, a pressure touch-and-drag input, an ordinary touch input, an ordinary touch-and-drag input, and a combination thereof.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

According to the present invention, if a first screen displayed on a touch screen is touched and then dragged, the first screen may be moved by an amount corresponding to the distance by which the first screen is dragged. On the other hand, if the first screen is pressure-touched and then dragged, the first screen may be moved by an amount corresponding to the level of pressure with which the first screen is pressure-touched. In addition, according to the present invention, it is possible to display a set of menu items associated with a screen displayed on a touch screen in response to a pressure-touch input and to choose one of the menu items according to the level of pressure corresponding to the pressure-touch input. Moreover, according to the present invention, it is possible to conveniently control various operations performed by a mobile terminal in response to a pressure-touch input, an ordinary touch input or both.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   displaying a first screen on a display module;
   receiving a pressure touch-and-drag input, having a diagonal direction, at the display module;
   selecting an area of the first screen corresponding to a drag distance of the received pressure touch-and-drag input;
   displaying a plurality of menu items associated with the selected area on the display module, wherein the displayed menu items are varied according to a drag direction of the received pressure touch-and-drag input;
   selecting at least one of the menu items according to a level of pressure corresponding to the received pressure touch-and drag input; and
   displaying an image indicating the level of pressure corresponding to the pressure touch-and-drag input.

2. The method of claim 1, further comprising displaying the selected menu item differently from one or more other menu items.

3. The method of claim 1, further comprising: when the pressure touch-and-drag input is detected from the first screen or another screen, enlarging the selected area at a scale corresponding to the level of pressure corresponding to the pressure touch-and-drag input.

4. The method of claim 1, further comprising:
   when another pressure touch-and-drag input is detected from the first screen or another screen along a first direction, displaying the menu items associated with one or more first screen or another screen.

5. The method of claim 4, further comprising,
   when another pressure touch-and-drag input is detected from the first screen along a second direction, displaying a second screen on the display module.

6. The method of claim 1, further comprising:
   when a pressure touch input is detected from the first screen, displaying one or more menu items associated with the first screen,
   wherein, when the first screen is a screen including a list of files and one of the files is pressure-touched, the method further comprises holding a delete-lock on the pressure-touched file.

7. The method of claim 1, further comprising:
when another pressure touch-and-drag input is detected from the first screen or another screen along a first direction, scrolling a displayed file list by an amount corresponding to the level of pressure corresponding to the pressure touch-and-drag input.

8. The method of claim 1, wherein:
the pressure touch-and-drag input is detected at a location on the screen different from a location where the selected menu item is located,
a first menu item of the plurality of menu items is selected when the pressure touch-and-drag input on the screen corresponds to a first pressure level, and
a second menu item of the plurality of menu items simultaneously displayed on the display module is selected when the pressure touch-and-drag input on the screen corresponds to a second pressure level different from the first pressure level.

9. The method of claim 8, further comprising:
performing an operation corresponding to the first menu item when a predetermined amount of time elapses after the first menu item is selectively selected from the plurality of menu items based on the first pressure level.

10. The method of claim 1, further comprising:
when a pressure touch input is detected from the first screen, displaying one or more menu items associated with the first screen; and
selecting the one or more menu items according to the level of pressure corresponding to the received pressure touch-and-drag input.

11. A mobile terminal comprising:
a display module configured to display a first screen;
a pressure sensor configured to detect a pressure touch-and-drag input on the touch screen from the display module and output a pressure signal indicating a level of pressure corresponding to the detected pressure touch-and-drag input, the pressure touch-and-drag input having a diagonal direction; and
a controller configured to:
  select an area of the first screen corresponding to a drag distance of the detected pressure touch-and-drag input,
  control the display module to display a plurality of menu items associated with the selected area, the displayed menu items being varied according to a drag direction of the detected pressure touch-and-drag input, and
  select at least one of the menu items according to the level of pressure corresponding to the detected pressure touch-and-drag input,
  wherein the controller displays, on the display module, an image corresponding to the pressure signal.

12. The mobile terminal of claim 11, wherein, when another pressure touch-and-drag input is detected from the first screen or another screen along a first direction, the controller moves the first screen or the another screen by an amount corresponding to the pressure signal.

13. The mobile terminal of claim 11, wherein:
the pressure touch-and-drag input is detected at a location on the screen different from a location where the selected menu item is located,
a first menu item of the plurality of menu items is selected when the pressure touch-and-drag input on the screen corresponds to a first pressure level, and
a second menu item of the plurality of menu items simultaneously displayed on the display module is selected when the pressure touch-and-drag input on the screen corresponds to a second pressure level different from the first pressure level.

14. The mobile terminal of claim 13, wherein the controller is further configured to perform an operation corresponding to the first menu item when a predetermined amount of time elapses after the first menu item is selectively selected from the plurality of menu items based on the first pressure level.

15. The mobile terminal of claim 11,
wherein, when a pressure touch input is detected from the first screen, the controller is further configured to:
control the display module to display one or more menu items associated with the first screen, and
select the one or more menu items according to the level of pressure corresponding to the detected pressure touch-and-drag input.

* * * * *